(12) United States Patent
Canter

(10) Patent No.: US 9,468,338 B1
(45) Date of Patent: Oct. 18, 2016

(54) PORTABLE AND MODULAR COOKING OIL CLEANING AND COOKING OIL REPLENISHMENT SYSTEM

(71) Applicant: Conrad D. Canter, Avondale, AZ (US)

(72) Inventor: Conrad D. Canter, Avondale, AZ (US)

( * ) Notice: Subject to any disclaimer, the term of this patent is extended or adjusted under 35 U.S.C. 154(b) by 730 days.

(21) Appl. No.: 13/864,770

(22) Filed: Apr. 17, 2013

(51) Int. Cl.
    *A47J 37/12*     (2006.01)
    *B01D 35/027*     (2006.01)
    *B01D 25/02*     (2006.01)

(52) U.S. Cl.
    CPC ................... *A47J 37/1223* (2013.01)

(58) Field of Classification Search
    CPC  A47J 37/1223; B01D 35/0273; B01D 25/02
    USPC ............. 210/143, 241, DIG. 8, 172.4, 416.5,
                              210/416.1, 167.28, 495
    See application file for complete search history.

(56) References Cited

U.S. PATENT DOCUMENTS

| | | | | |
|---|---|---|---|---|
| 4,517,082 A | * | 5/1985 | Prudhomme | ....... A47J 37/1223 210/117 |
| 5,340,471 A | * | 8/1994 | Wilson | ................ A47J 37/1223 210/167.28 |
| 5,404,799 A | * | 4/1995 | Bivens | ................ A47J 37/1223 134/111 |
| 6,378,420 B1 | * | 4/2002 | Savage | ............... A47J 37/1223 210/167.28 |
| 8,920,140 B2 | * | 12/2014 | Snyder | ................... B01D 61/10 210/184 |
| 2002/0046657 A1 | * | 4/2002 | Takahashi | ........... A47J 37/1223 99/330 |
| 2013/0008320 A1 | * | 1/2013 | Kilmer | ................ A47J 37/1223 99/408 |

\* cited by examiner

*Primary Examiner* — Madeline Gonzalez
(74) *Attorney, Agent, or Firm* — Michael W. Goltry; Robert A. Parsons; Parsons & Goltry

(57) ABSTRACT

A portable and modular cooking oil cleaning system includes a wheeled carriage module, a filtering module rested on the wheeled carriage module, and a pump module removably coupled to the wheeled carriage module. The pump module includes a cooking oil return outlet coupled in fluid communication to a cleaned cooking oil inlet configured to be removably coupled in fluid communication to the cleaned cooking oil outlet of the filtering module so as to form a cooking oil flow pathway through the filtering and pump modules from the filtering module to the cooking oil return outlet of the pump module, and a pump. The pump generates a flow of used cooking oil through the cooking oil flow pathway, and the filter system of the cooking oil filtering module entraps contaminants from the flow of used cooking oil in the cooking oil flow pathway through the cooking oil filtering module.

21 Claims, 26 Drawing Sheets

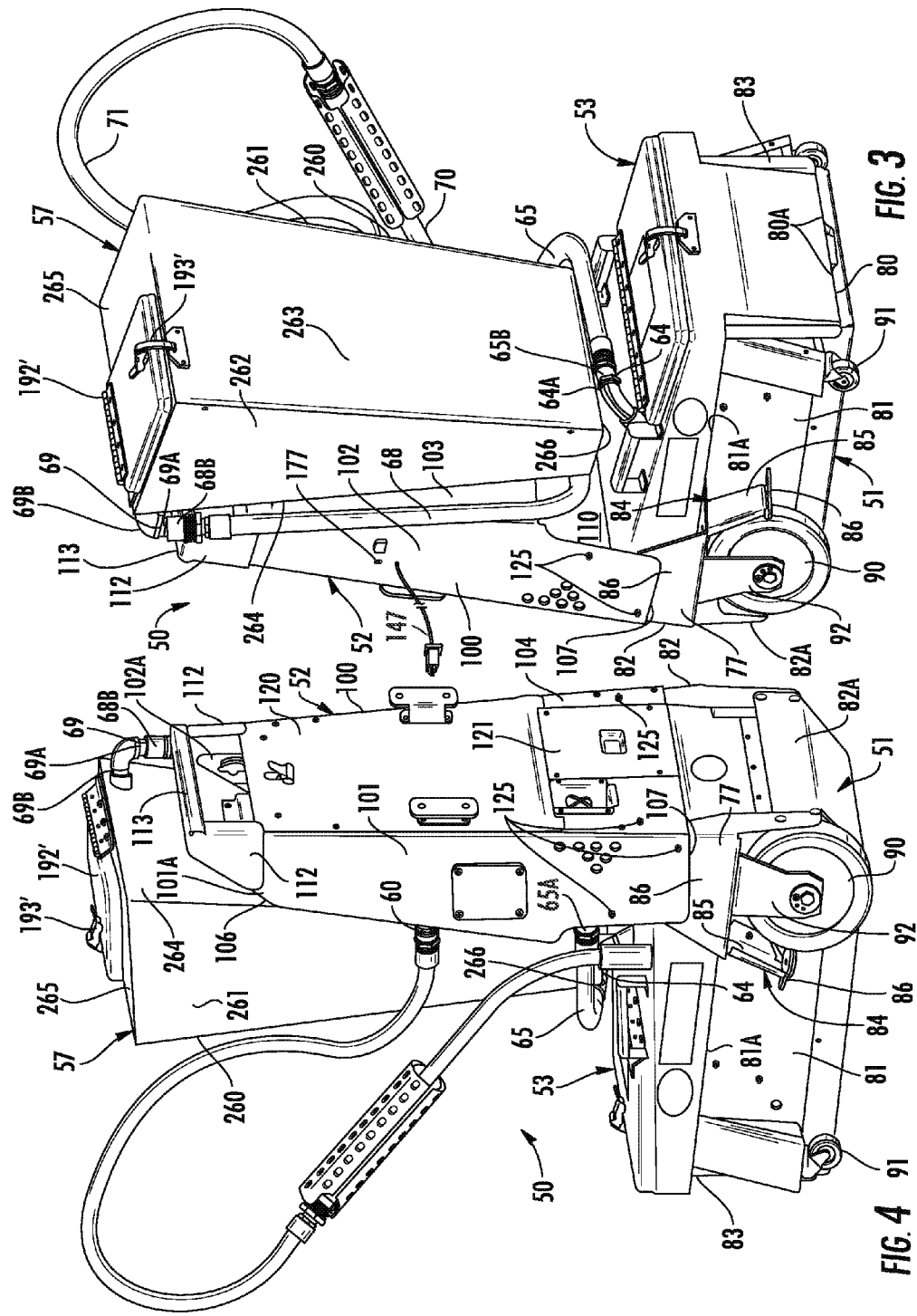

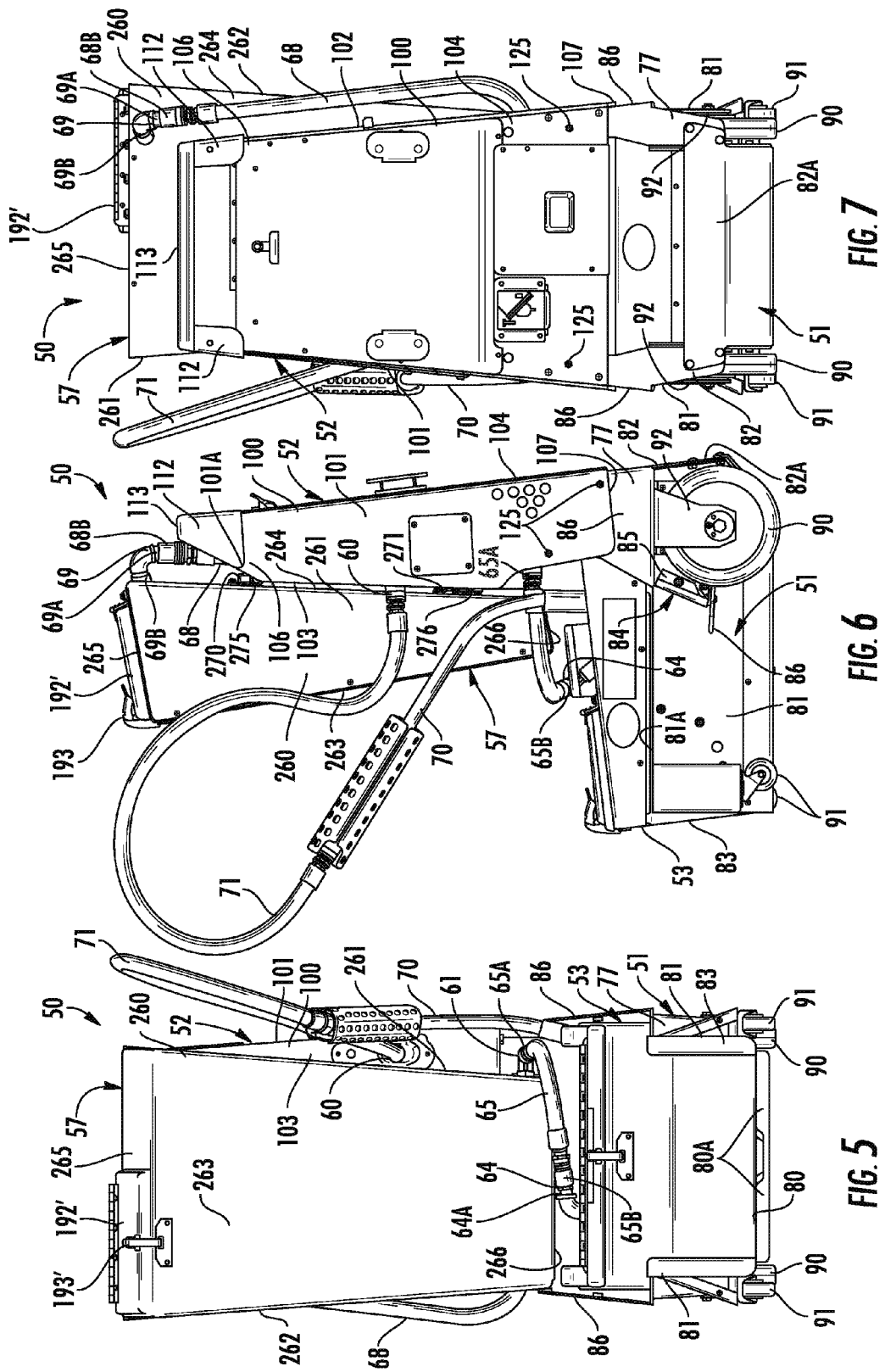

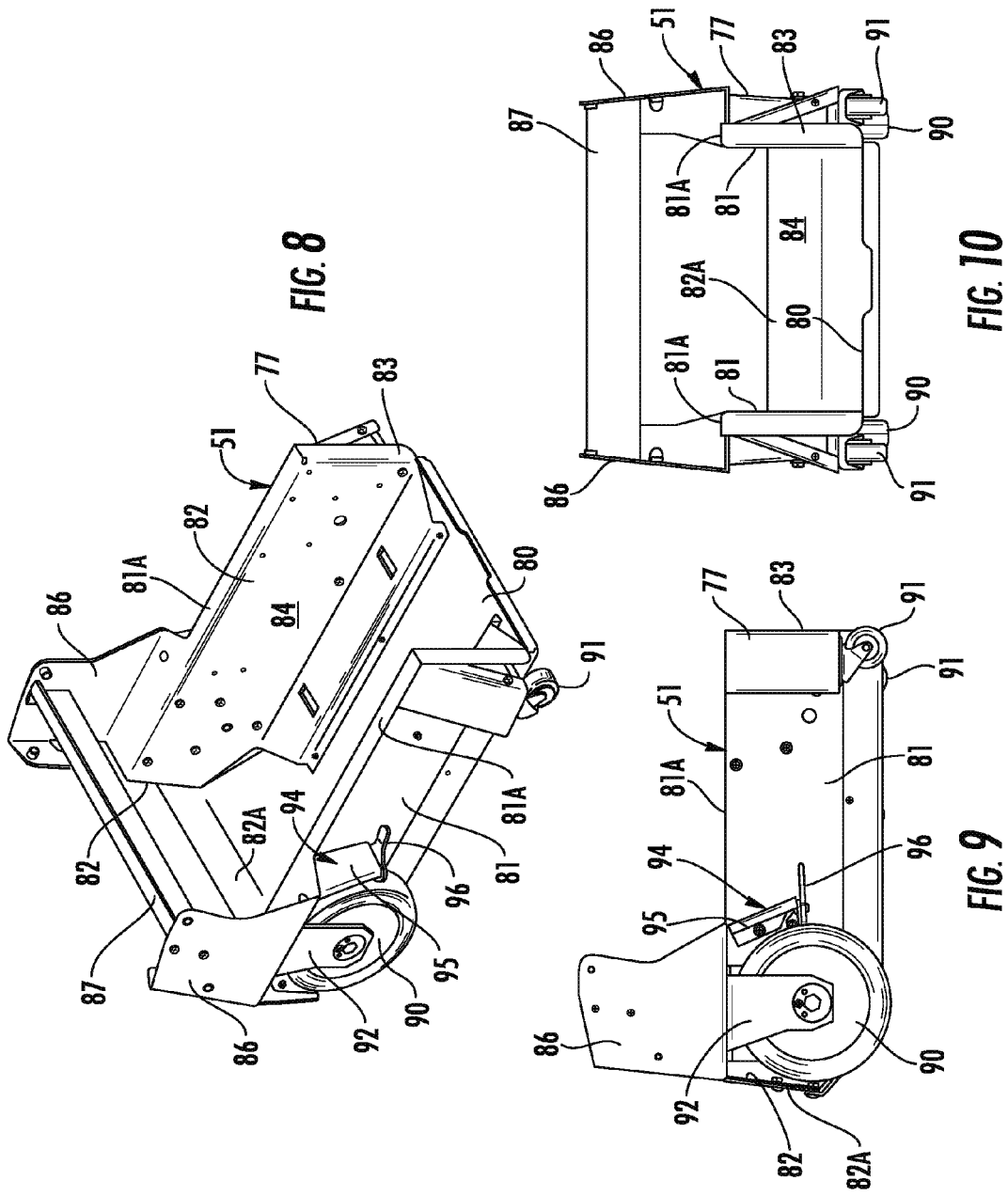

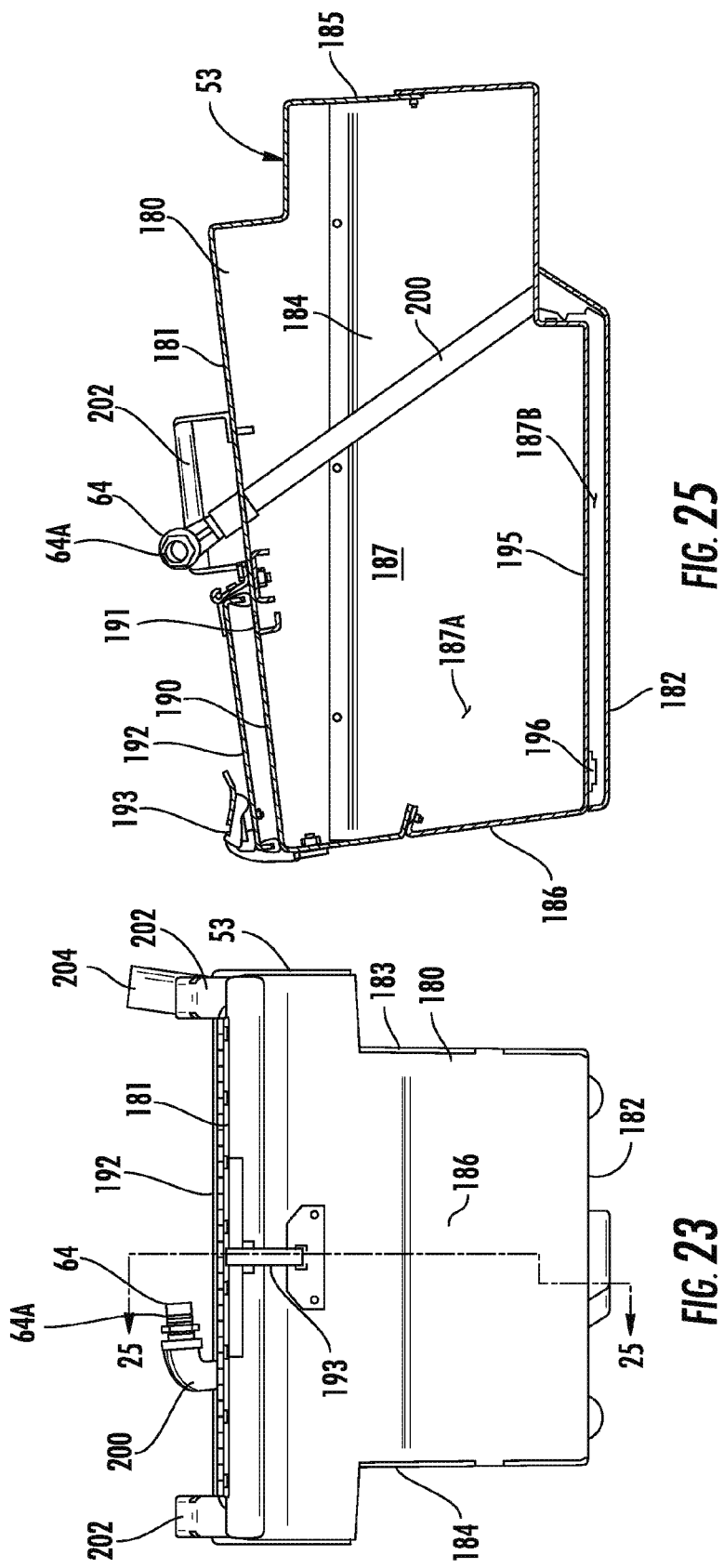

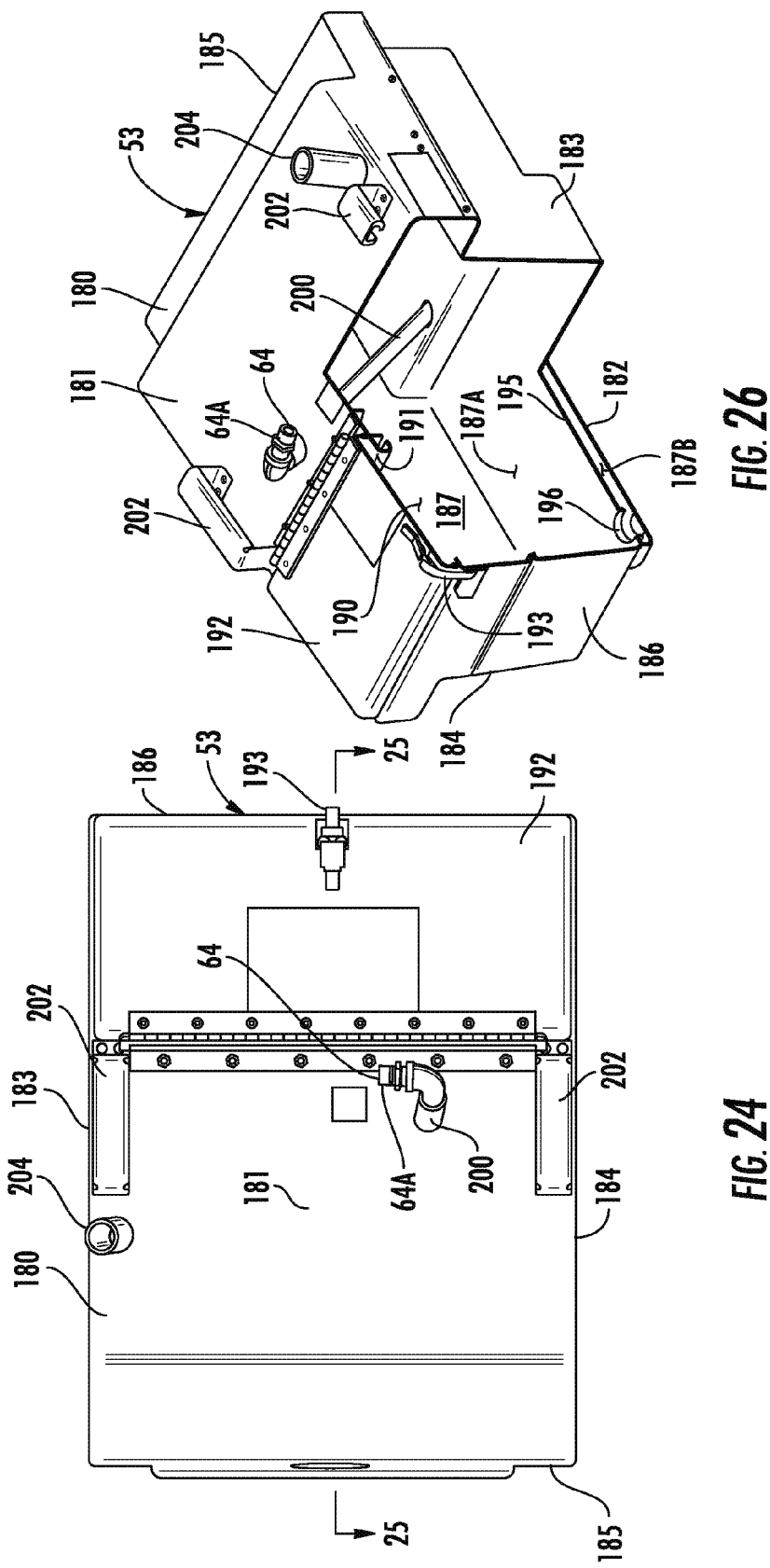

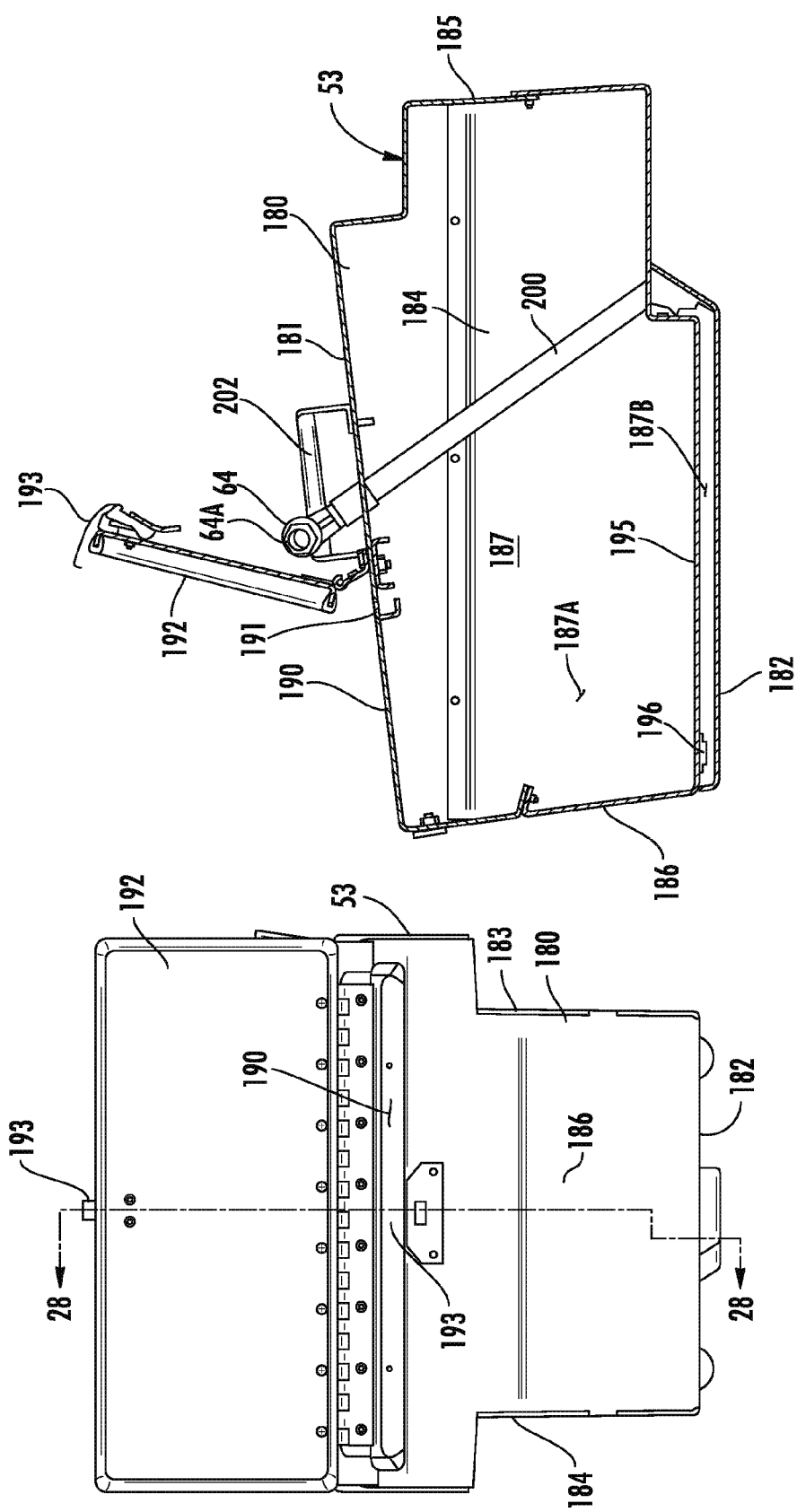

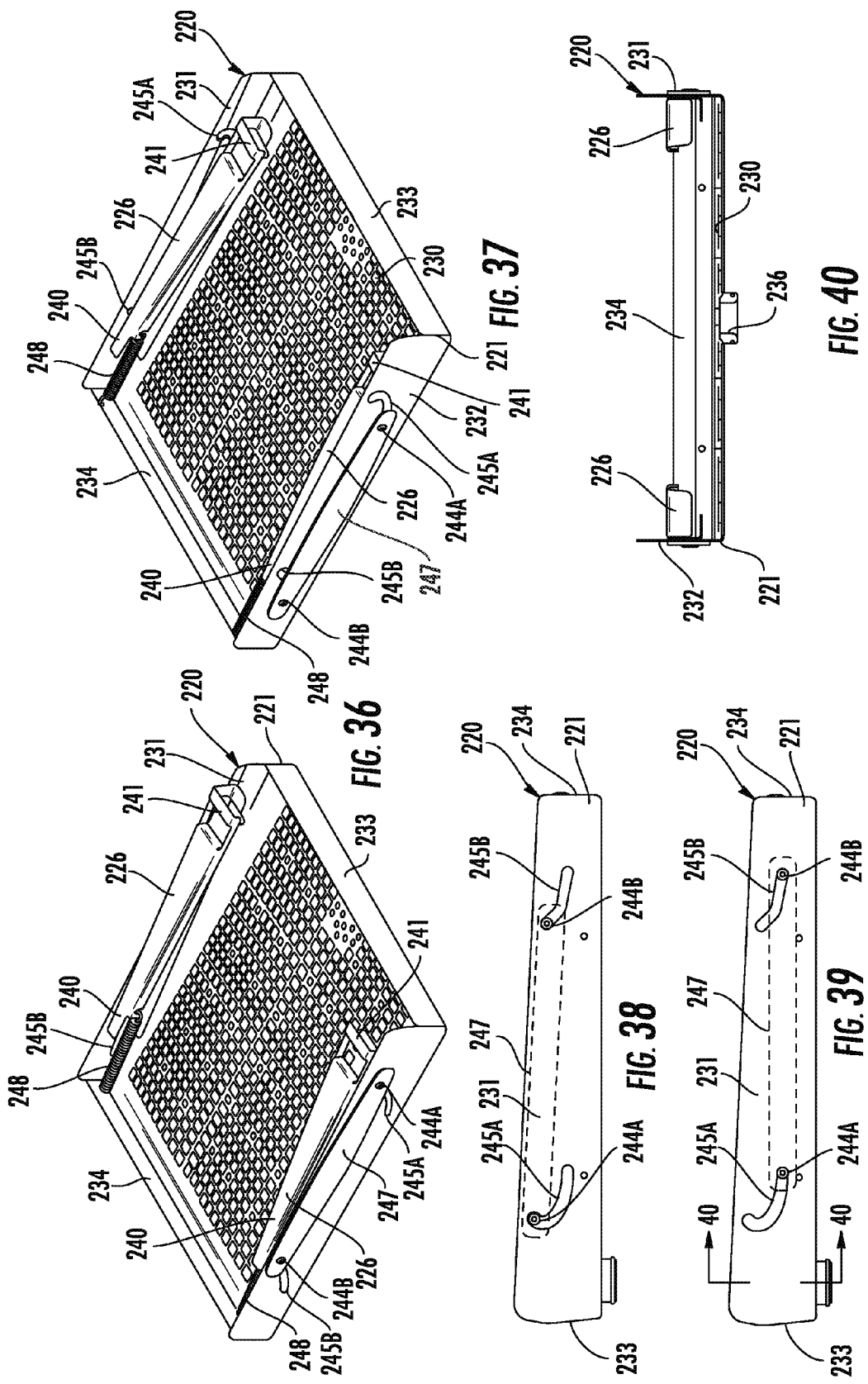

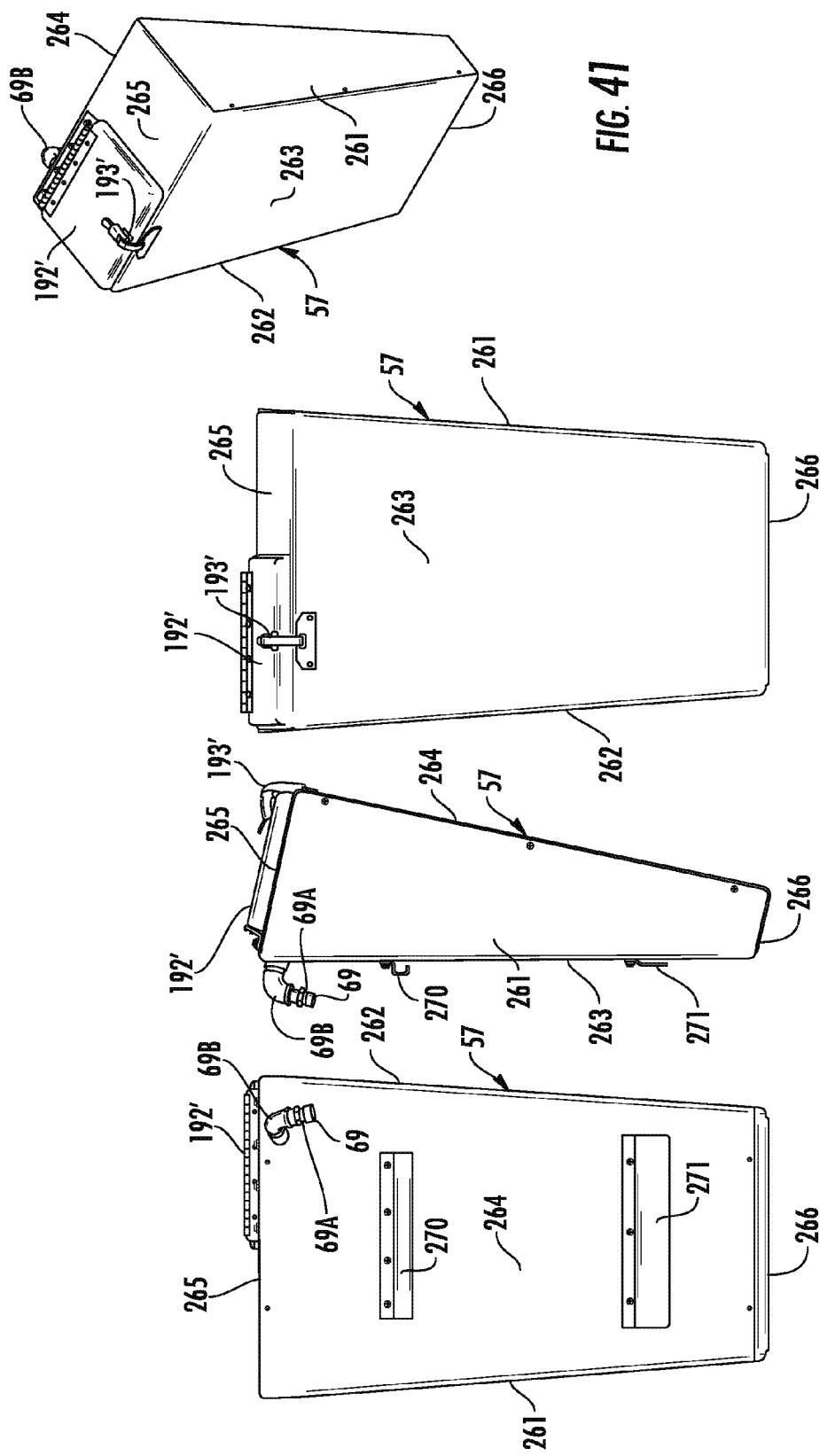

PORTABLE AND MODULAR COOKING OIL CLEANING AND COOKING OIL REPLENISHMENT SYSTEM

FIELD OF THE INVENTION

The present invention relates to restaurant equipment and supplies and, more particularly, to apparatus and methods for cleaning and replenishing deep fat fryer cooking oil.

BACKGROUND OF THE INVENTION

There are two principle components of proper maintenance of commercial deep fryers. First, the machine parts of the fryer must be periodically inspected, cleaned, serviced, and, when required, replaced. Second, the cooking oil must be regularly filtered, regularly replenished, and periodically replaced. The best way to prolong the life of the cooking oil is to filter it regularly. Although the filtering frequency depends on cooking volume and the type of cooking oil, it is recommended that the cooking be filtered daily at least once or twice. The cooking oil should be replaced when it turns dark brown or starts to smell or begins to impart an unpleasant taste to food, and this normally occurs with the oil reaches approximately 24 TPC (Total Polar Compounds or Total Polar Materials). Filtering and replacing commercial deep fryer cooking oil should be done quickly, efficiently, and safely to reduce downtime and to minimize labor costs. To this end, there is a need in the art for a cooking oil filtering and replenishment system that is easy to construct, easy to assembly, easy to clean and disassemble for transport, that is lightweight and portable so as to be easily moved about as needed, that is useful for efficiently filtering and replenishing cooking oil, and that is easy to use without the need for specialized training.

SUMMARY OF THE INVENTION

According to the principle of the invention, a portable and modular cooking oil cleaning system includes a wheeled carriage module, a filtering module, and a pump module. The filtering module is rested on the wheeled carriage so as to be readily removable, and includes a used cooking oil inlet, a cleaned cooking oil outlet, and a filter system therebetween. The pump module is removably coupled to the wheeled carriage module, which means that pump module is joined to wheeled carriage module in such a manner as to be readily separable and is a more permanent connection than simply resting on the wheeled carriage module as with the filtering module. The pump module includes a cooking oil return outlet coupled in fluid communication to a cleaned cooking oil inlet configured to be removably coupled in fluid communication to the cleaned cooking oil outlet of the filtering module so as to form a cooking oil flow pathway through the filtering and pump modules from the used cooking oil inlet of the filtering module to the cooking oil return outlet of the pump module, and a pump for generating a flow of used cooking oil through the cooking oil flow pathway. The filter system of the cooking oil filtering module is for entrapping contaminants from the flow of used cooking oil in the cooking oil flow pathway through the cooking oil filtering module. The pump module is removably coupled to the wheeled carriage module with mechanical fastening. The filter system includes a separator filter in the cooking oil flow pathway through the filtering module between the used cooking oil inlet and the cleaned cooking oil outlet, and a pre-filter in the cooking oil flow pathway through the filtering module between the used cooking oil inlet and the separator filter for removing gross solid contaminants from the flow of used cooking oil before the separator filter. The separator filter is held in the cooking oil flow pathway by a filter tray mounted to the filtering module. A frame is coupled to the filter tray so as to hold the separator filter to the filter tray. A brace assembly is configured to hold the frame to the separator filter so as to hold the separator filter to the filter tray. The brace assembly is carried by the filter tray and consists of spring-loaded braces configured to extend toward the frame so as to urge the frame to the separator filter. The cooking oil return outlet is a pipe fitting configured to be removably coupled in fluid communication to an outtake hose fitting of an outtake hose. A fitting kill switch is operatively coupled between the pipe fitting of the cooking oil return outlet and the pump for enabling the pump in response to a competent coupling between the outtake hose fitting of the outtake hose and the pipe fitting of the cooking oil return outlet, and for disabling the pump in response to an incompetent coupling between the outtake hose fitting of the outtake hose and the pipe fitting of the cooking oil return outlet. The pump module is fashioned with a compartment closeable with a detachable cover. There is another kill switch operatively coupled between the detachable cover and the pump for enabling the pump in response to a competent closure of the compartment with the detachable cover, and for disabling the pump in response to an incompetent closure of the compartment with the detachable cover. The compartment houses a battery power source operatively coupled to power the pump.

According to the principle of the invention, a portable and modular cooking oil cleaning and cooking oil replenishment system includes a wheeled carriage module, a filtering module, a pump module, and a fresh cooking oil module. The filtering module is rested on the wheeled carriage so as to be readily removable, and includes a used cooking oil inlet, a cleaned cooking oil outlet, and a filter system therebetween. The pump module is removably coupled to the wheeled carriage module. The fresh cooking oil module is rested on the pump module so as to be readily removable. The pump module is removably coupled to the wheeled carriage module as set forth above, and this means that pump module is joined to wheeled carriage module in such a manner as to be readily separable and is a more permanent connection than simply resting on the wheeled carriage module as with the filtering module or simply resting on pump module as with fresh cooking oil module. The pump module includes a cooking oil return outlet coupled in fluid communication to a fresh cooking oil inlet, and a cleaned cooking oil inlet configured to be removably coupled in fluid communication to the cleaned cooking oil outlet of the filtering module so as to form a filtering cooking oil flow pathway through the filtering and pump modules from the used cooking oil inlet of the filtering module to the cooking oil return outlet of the pump module, a pump for generating a flow of used cooking oil through the filtering cooking oil flow pathway, and a valve coupled between the cleaned cooking oil and fresh cooking oil inlets. The filter system of the cooking oil filtering module is for entrapping contaminants from the flow of used cooking oil in the cooking oil flow pathway through the cooking oil filtering module. The fresh cooking oil inlet of the pump module is configured to be removably coupled in fluid communication to the fresh cooking oil module so as to form a fresh cooking oil flow pathway from the fresh cooking oil module to the cooking oil return outlet of the pump module, and the pump is for generating a flow of fresh cooking oil through the fresh cooking oil flow pathway. The valve of the pump module is adjustable between a cleaned cooking oil setting isolating the cooking oil return outlet from the fresh cooking oil inlet, and a fresh cooking oil setting isolating the cooking oil return outlet from the cleaned cooking oil inlet. The pump module is removably coupled to the wheeled carriage module with mechanical fastening. The filter system includes a separator filter in the cooking oil flow pathway through the filtering module between the used cooking oil inlet and the cleaned cooking oil outlet, and a pre-filter in the cooking oil flow pathway through the filtering module between the used cooking oil inlet and the separator filter for removing gross solid contaminants from the flow of used cooking oil before the separator filter. The separator filter is held in the cooking oil flow pathway by a filter tray mounted to the filtering module. A frame is coupled to the filter tray so as to hold the separator filter to the filter tray. A brace assembly is configured to hold the frame to the separator filter so as to hold the separator filter to the filter tray. The brace assembly is carried by the filter tray and consists of spring-loaded braces configured to extend toward the frame so as to urge the frame to the separator filter. The cooking oil return outlet is a pipe fitting configured to be removably coupled in fluid communication to an outtake hose fitting of an outtake hose. A fitting kill switch is operatively coupled between the pipe fitting of the cooking oil return outlet and the pump for enabling the pump in response to a competent coupling between the outtake hose fitting of the outtake hose and the pipe fitting of the cooking oil return outlet, and for disabling the pump in response to an incompetent coupling between the outtake hose fitting of the outtake hose and the pipe fitting of the cooking oil return outlet. The pump module is fashioned with a compartment closeable with a detachable cover. There is another kill switch operatively coupled between the detachable cover and the pump for enabling the pump in response to a competent closure of the compartment with the detachable cover, and for disabling the pump in response to an incompetent closure of the compartment with the detachable cover. The compartment houses a battery power source operatively coupled to power the pump.

BRIEF DESCRIPTION OF THE DRAWINGS

Referring to the drawings:

FIG. 3 is a front, right side perspective view of the embodiment of FIG. 2;

FIG. 4 is a rear, left side perspective view of the embodiment of FIG. 2;

FIG. 5 is a front elevation view of the embodiment of FIG. 2;

FIG. 6 is a left side elevation view of the embodiment of FIG. 2;

FIG. 7 is a rear elevation view of the embodiment of FIG. 2;

FIG. 8 is a perspective view of the wheeled carriage module first illustrated in FIG. 1;

FIG. 9 is a right side elevation view of the embodiment of FIG. 8, the opposite left side elevation view being substantially the same thereof;

FIG. 10 is a front elevation view of the embodiment of FIG. 8;

FIG. 23 is a front elevation view of the cooking oil filtering module first illustrated in FIG. 1;

FIG. 24 is a top plan view of the embodiment of FIG. 23;

FIG. 25 is a section view taken along line 25-25 of FIG. 24;

FIG. 26 is perspective view of the embodiment of FIG. 23 with portions thereof being broken away for illustrative purposes;

FIG. 27 is view similar to that of FIG. 23 illustrating a lid as it would appear open so as to open a used oil inlet leading to the interior of the cooking oil filtering module;

FIG. 28 is a section view taken along line 28-28 of FIG. 27;

FIG. 36 is a perspective view of the filter tray of FIG. 33 with the spring-loaded braces shown as they would appear in raised, unbraced positions;

FIG. 37 is a perspective view of the filter tray of FIG. 33 with the spring-loaded braces shown as they would appear in lowered, braced positions;

FIG. 38 is a partially schematic side elevation view of the embodiment of FIG. 36;

FIG. 39 is a partially schematic side elevation view of the embodiment of FIG. 37;

FIG. 40 is a section view taken along line 40-40 of FIG. 39;

FIG. 41 is a perspective view of the fresh oil tank module first illustrated in FIG. 1;

FIG. 42 is a front elevation view of the embodiment of FIG. 41;

FIG. 43 is a rear elevation view of the embodiment of FIG. 41; and

FIG. 44 is a side elevation view of the embodiment of FIG. 41.

DETAILED DESCRIPTION

Figure 1:
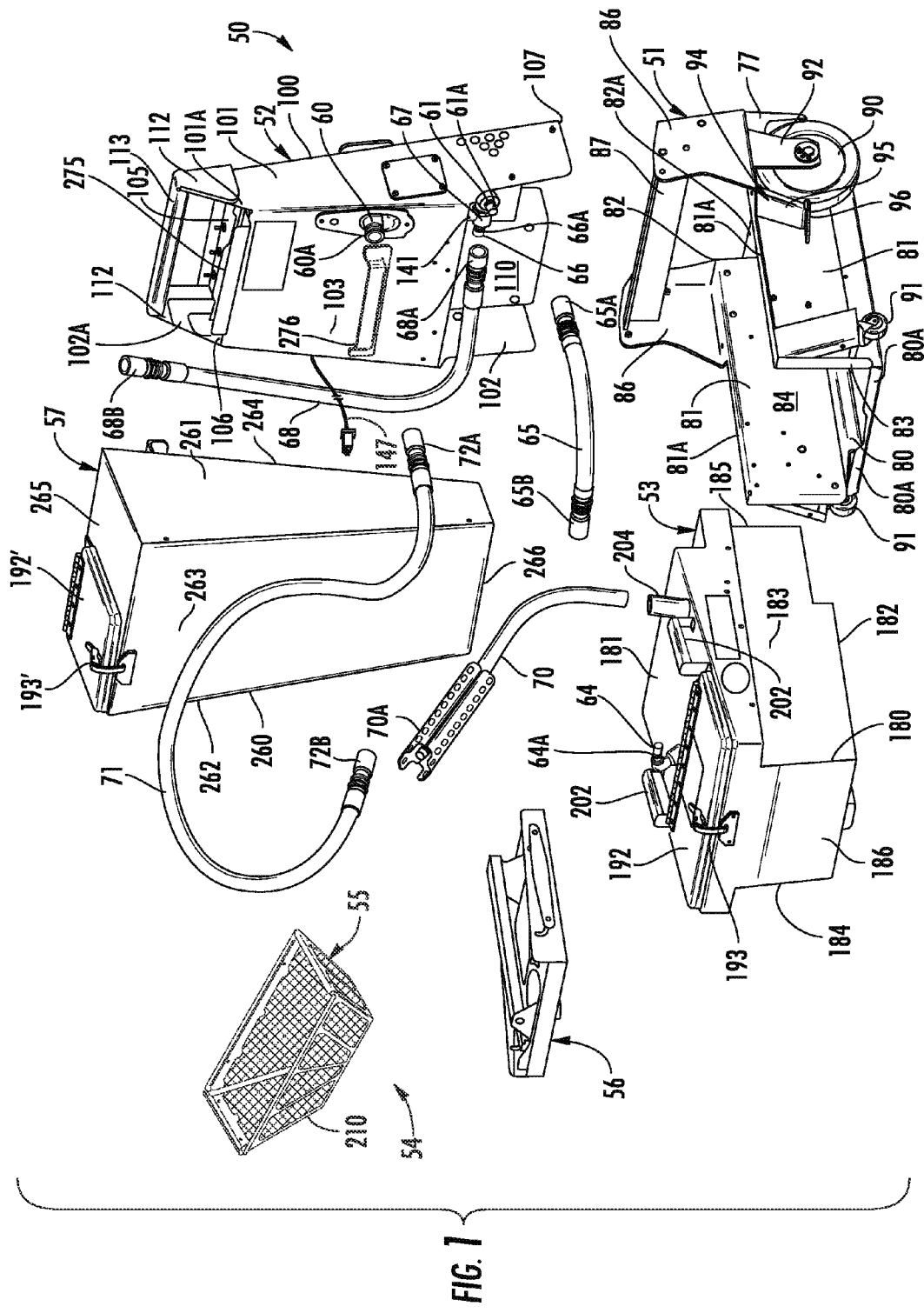
FIG. 1 is an exploded perspective view of a portable and modular cooking oil cleaning and cooking oil replenishment system constructed and arranged in accordance with the principle of the invention, the system including a wheeled carriage module, a pump module configured to be removably coupled to the wheeled carriage module, a cooking oil filtering module, including a filter system that includes a pre-filter and a separator filter assembly, adapted to be rested on the wheeled carriage module, and a fresh cooking oil module configured to be rested on the pump module.

Turning now to the drawings, in which like reference characters indicate corresponding elements throughout the several views, attention is directed to FIG. 1 in which there is seen an exploded perspective view of a portable and modular cooking oil cleaning and cooking oil replenishment system 50 constructed and arranged in accordance with the principle of the invention. In general, system 50 includes a wheeled carriage module 51, and a pump module 52 configured to removably coupled in cooking oil fluid communication to both to a filtering module 53 for pumping cooking oil to be cleaned via filtering through a filtering cooking oil flow pathway of filtering module 53 and pump module 52, and to fresh cooking oil module 57 for pumping fresh cooking oil through a fresh cooking oil flow pathway of fresh cooking oil tank module 57 and pump module 51 for cooking oil replenishment and/or replacement. These aforementioned modules are each self-contained, namely, a complete and independent unit in and of itself. The modularity of system 50 allows it to be easily assembled and disassembled. Pump module 52 is configured to be removably coupled to wheeled carriage module 51 as shown in FIGS. 2-7. Filtering module 53, which includes a filter system 54 made up of a pre-filter 55 and a separator filter assembly 56, is adapted to be rested on wheeled carriage module 51 as shown in FIGS. 2-7 so as to held by wheeled carriage module so as to be readily removable. The resting or rested application of filtering module 53 to wheeled carriage module 51 is a form of a coupling of filtering module 53 to wheeled carriage module 51, which couples filtering module 53 to wheeled carriage module 51. Fresh cooking oil module 57 is configured to be rested on pump module 52 as shown in FIGS. 2-7 so as to be readily removable. The resting or rested application of fresh cooking oil module 57 to pump module 52 is a form of a coupling of fresh cooking oil module 57 to pump module 52, which couples fresh cooking oil module 57 to pump module 52.

Pump module 52 is removably coupled to wheeled carriage module 52 as set forth above, and this means that pump module 52 is joined to wheeled carriage module 51 in such a manner as to be readily separable and is a more permanent connection than simply a rested or resting application, such as the rested or resting application of filtering module 53 to wheeled carriage module 51 and the rested or resting application of fresh cooking oil module 57 to pump module 51. When assembled as in FIGS. 2-7, system 50 is portable in that is easily wheeled about via wheeled carriage module 51 and is useful for cleaning used cooking oil from deep fat fryers via filtering at filtering module 53, and for replenishing and replacing used deep fat fryer cooking oil with fresh deep fat fryer cooking oil from fresh cooking oil module 57. Again, the modular construction of system 50 defined by the aforementioned modular components allows system 50 to be easily assembled as in FIGS. 2-7 for use in cooking oil cleaning and replenishment, and allows system 50 to be easily disassembled as in FIG. 1 for convenient storage and transport during periods of nonuse.

Referring to FIGS. 1-7 in relevant part, pump module 52 has a manifold 141 including a cooking oil return outlet 60 coupled in fluid communication to a cleaned cooking oil inlet 61 and to a fresh cooking oil inlet 66, and a valve 67 coupled between cleaned cooking oil inlet 61 and fresh cooking oil inlet 66. Cleaned cooking oil inlet 61 is configured to be removably coupled in fluid communication to a cleaned cooking oil outlet 64 of filtering module 53 via a cleaned cooking oil conduit or hose 65 so as to form a filtering cooking oil flow pathway through filtering module 53 and through pump module 52 via manifold 141 from cleaned cooking oil inlet 61 to cooking oil return outlet 60. Hose 65 is considered a cleaned cooking oil intake hose for conveying cooking oil from filtering module 53 cleaned via filtering to pump module 52. Pump module 52 has a pump operatively coupled to manifold 141 so as to be operative to pump cooking oil through manifold 141 for generating a flow of cleaned used cooking oil through the described filtering cooking oil flow pathway, and filter system 54 of cooking oil filtering module 53 is for entrapping contaminants from the flow of used cooking oil in the described filtering cooking oil flow pathway through the filtering module 53 so as to clean the used cooking oil via filtering so as to produce cleaned used cooking oil.

Fresh cooking oil inlet 66 of pump module 52 is configured to be removably coupled in fluid communication to a fresh cooking oil outlet 69 fresh cooking oil module 57 via a fresh cooking oil conduit or hose 68 so as to form a fresh cooking oil flow pathway of fresh cooking oil module 57 and pump module 52 via manifold 141 from fresh cooking oil inlet 66 to cooking oil return outlet 60. Hose 68 is considered a fresh cooking oil intake hose for conveying fresh cooking oil from fresh cooking oil module 57 to pump module 52. The pump of pump module 52 is operatively coupled to manifold 141 so as to be operative to pump cooking oil through manifold 141 for generating a flow of fresh cooking oil through the described fresh cooking oil flow pathway.

Valve 67 of pump module 52 is adjustable between a cleaned cooking oil setting and a fresh cooking oil setting. In the cleaned cooking oil setting, valve 67 isolates cooking oil return outlet 60 from fresh cooking oil inlet 66 so as to isolate and enable the filtering cooking oil flow pathway from the fresh cooking oil flow pathway. In the fresh cooking oil setting, valve 67 isolates cooking oil return outlet 60 from cleaned cooking oil inlet 61 so as to isolate and enable the fresh cooking oil flow pathway from the filtering cooking oil flow pathway. In the cleaned cooking oil setting of valve 67, the filtering cooking oil flow pathway is enabled and the fresh cooking oil flow pathway is disabled, whereby system 50 is configured for use in cleaning used cooking oil via filtering through the filtering cooking oil flow pathway. In the fresh cooking oil setting of valve 67, the fresh cooking oil flow pathway is enabled and the filtering cooking oil flow pathway is disabled, whereby system 50 is configured for use in providing fresh cooking oil from fresh cooking oil module 57 via the fresh cooking oil flow pathway for cooking oil replenishment or replacement purposes. Cooking oil return outlet 60 is configured to be removably coupled in fluid communication to a cooking oil delivery wand 70 via a cooking oil return conduit or hose 71 for use in aiming and applying cleaned cooking oil to a deep fat fryer via wand 70 in the cleaned cooking oil setting of valve 67, and for use in aiming and applying fresh cooking oil to a deep fat fryer via wand 70 in the fresh cooking oil setting of valve 67. Hose 71 is considered a cooking oil outtake hose. Wand 70 is easily taken up and wielded by hand for focusing a stream of cooking oil therefrom into a deep fat fryer.

§A. The Wheeled Carriage Module

Referring to FIGS. 1-10 in relevant part, wheeled carriage module 51 is self-contained and is fashioned of paneled sheet metal, such as aluminum or steel sheet metal, the various parts of which are bent to shape and fastened together with welding and/or fasteners, such as rivets. Wheeled carriage module 51 consists of a generally U-shaped carriage body, denoted at 77, including a floor 80 that extends between opposed, parallel, upstanding side sheets 81 at the opposed sides of wheeled carriage module 51. Side sheets 81 extend upright from floor 80 to upper marginal edges 81A at the top of the carriage body 77. Floor 80 and side sheets 81 define and extend between a rear end 82 and an opposed front end 83. Rear end 82 is formed with a transom 82A connected between bottom 80 and side sheets 81. Front end 83 and the top of the carriage body between upper marginal edges 81A of side sheets 81 are open to a generally U-shaped filtering module receiving area or pocket 84 defined by and between floor 80 and side sheets 81, and between transom 82 at rear end 82 to front end 83. Pocket 84 is adapted to receive and hold via resting filtering module 53, and this is discussed in more detail below. Upstanding lips 80A are formed in floor 80 along front end 83 of carriage body 77 of wheeled carriage module 51, which interact with filtering module 53 when rested on wheeled carriage module 51 in receiving area 84 so as to inhibit filtering module 53 from slipping out of receiving area 84 front end 83 of wheeled carriage module 51. A pair of opposed, upstanding brackets 86 is formed on either side of carriage body 77 near rear end 82, which extend upright from upper marginal edges 81A and which are rigidified for enhanced strength with a transverse rail rigidly connected between the opposed brackets 86, such as with welding or rivets.

Carriage body 77 is formed with a pair of opposed rear wheels 90, and a pair of opposed front wheels 91, which allows wheeled carriage module to be wheeled about across floor in a forward direction leading with front end 83 and in a rearwardly direction leading with rear end 82. Rear wheels 90 are mounted for rotation to wheel supports 92 removably coupled to the underside of the respective brackets 86 at rear end 82 of carriage body 77 along the respective side sheets 81 on either side of carriage body 77 near rear end 82, and front wheels 91 are mounted for rotation to the respective side sheets 81 on either side of carriage body near front end 83. Rear wheels 90 are considerably larger than front wheels 91, which are small caster wheels that swivel 360 degrees to allow wheeled carriage module 51 to be steered. Wheel supports 92 are removably coupled to the underside of the respective brackets 86 with nut-and-bolt assemblies which allows each assembled wheel support 92 and rear wheel 90 to be readily removed when needed, such as for maintenance or replacement.

Figure 11:
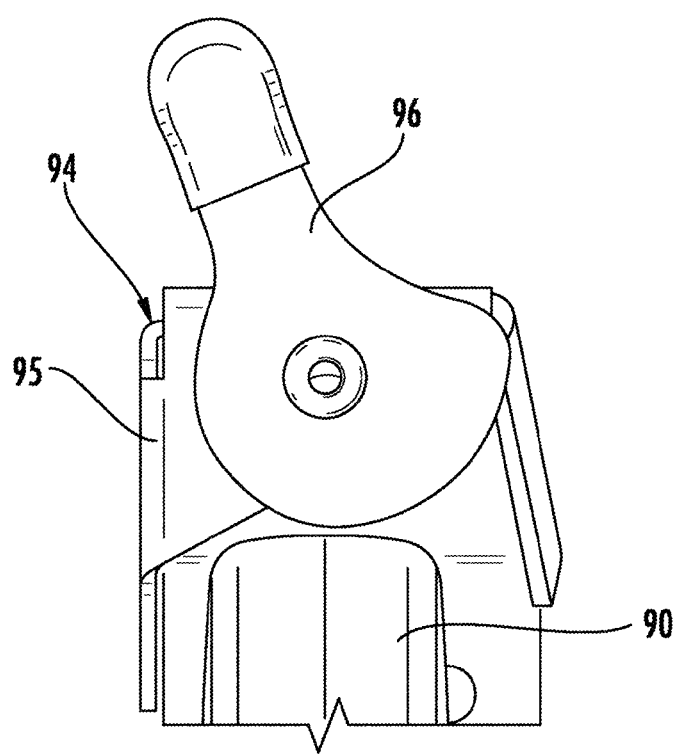
FIG. 11 is an enlarged view illustrating a parking break of the embodiment of FIG. 8 shown as it would appear unlocked.
Figure 12:
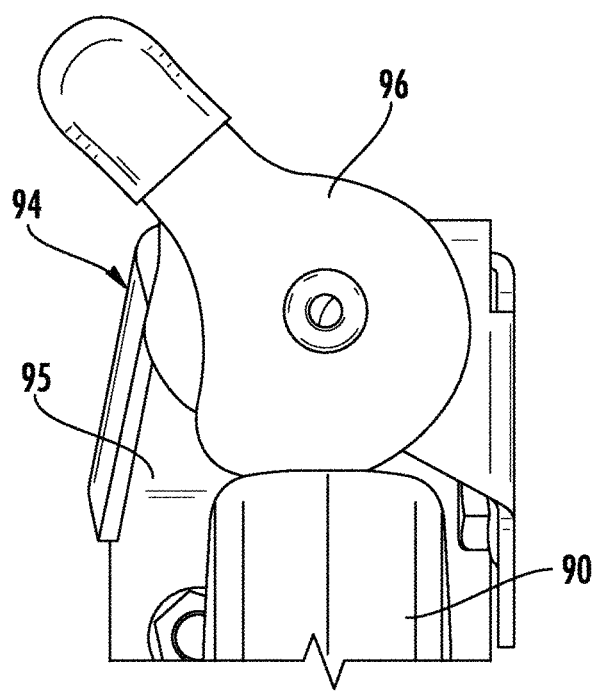
FIG. 12 is a view similar to that of FIG. 11 illustrating the parking brake as it would appear locked.

Wheeled carriage module 51 has parking brakes 94 used to park wheeled carriage module 51 so as to keep wheeled carriage module 51 stationary. Parking brakes 94 are identical, and area each associated with one of rear wheels 90 in the present embodiment. Parking brakes 94 consist of brackets 95 affixed to side sheets 81 on either side of carriage body 77, and which depend downwardly from the top of carriage body 77 forwardly of rear wheels 90 to levered cams 96 mounted for rotation between an unlocked position, as shown in FIG. 11, freeing wheeled carriage module 51 for wheeled movement, and a locked position, shown in FIG. 12, locking rear wheels 90 from rotation for parking wheeled carriage module 51 so as to keep wheeled carriage module 51 stationary, such as during cooking oil cleaning and replenishment/replacement operations. In the unlocked position as shown in FIG. 11, levered cam 96 is rotated away from the corresponding rear wheel 90. In the locked position as shown in FIG. 12, levered cam 96 is rotated against the corresponding rear wheel 90 isolating the corresponding rear wheel 90 from rotation.

§B. The Pump Module

Referring now in relevant part to FIGS. 1-7, and FIGS. 13-18, pump module 52 is self-contained, is configured to be removably coupled to wheeled carriage module 51, and consists of a housing 100 that supports the functional machine or working parts of pump module 52. Housing 100 is fashioned of paneled sheet metal, such as aluminum or steel sheet metal, the various parts of which are bent to shape and fastened together with welding and/or fasteners, such as rivets. Housing 100 has opposed side sheets 101 and 102, and a front 103 and an opposed back 104 that extend between side sheets 101 and 102. Side sheets 101 and 102 and back 104 extend between a horizontal top 105 at an upper end 106 of housing 100, and an opposed lower end 107 of housing 100. Front 103 extends downwardly from upper end 106 of housing 100 to marginal extremity 103A located between upper and lower ends 106 and 107 and that is closer to lower end 107 than to upper end 106, and this forms a receiving area or pocket 110 defined by the portions of side sheets 101 and 102 and back 104 extending downwardly from marginal extremity 103A. Extensions 101A and 102A of side sheets 101 and 102 extend upright from upper end 106 and top 105 of housing 100. A bracket 112 is rigidly affixed to the outside of each of extensions 101A and 102A, respectively, such as by rivets, bolts, or other form of mechanical fasteners, or by welding. A handle 113 is rigidly connected between brackets 112 above top 105, and is available to be taken up by hand for carrying pump module 52 and for wheeling system 50 about when assembled as in FIGS. 2-7. Handle 113 is integrally formed with brackets 112 in the preferred embodiment, and may otherwise be rigidly connected with mechanical fasteners, such as rivets or bolts or the like, or welding.

Pump module 52 is configured to be removably coupled to wheeled carriage module 51, and again this means that pump module 52 is joined to wheeled carriage module 51 in such a manner as to be readily separable and is a more permanent connection than simply a rested or resting application, such as the rested or resting application of filtering module 53 to wheeled carriage module 51 and the rested or resting application of fresh cooking oil module 57 to pump module 51. According to the principle of the invention, lower end 107 of pump module 52 is adapted to be removably coupled brackets 86 formed in rear end 82 of wheeled carriage module 51. To removably couple lower end 107 to wheeled carriage module 51, lower end 107 of pump module 52 is applied over brackets 86 so to apply brackets 86 and rail 87 connected therebetween into pocket 110 and so as to locate side sheets 101 and 102 leading to lower end 107 of pump module 52 on the outer sides of brackets 86 with front 103 facing forwardly in the direction of front end 83 of wheeled carriage module 51 and back facing in the opposite rearward direction, and brackets 86 are then removably coupled to brackets 86 with mechanical fastening via mechanical fasteners 115, which are conventional nut-and-bolt assemblies in the preferred embodiment. Pump module 52 extends upright from rear end 82 of wheeled carriage module 51 and lower end 107 of pump module 52 to upper end 106 of pump module 52 formed with handle 113, as shown in FIGS. 2-7. Wheeled carriage module 51 extends in a horizontal direction from rear end 82 to front end 83, and pump module 52 extends upright in a comparatively vertical direction from lower end 107 to upper end 106 formed with handle 113, with front 103 facing forwardly in the direction of front end 83 of wheeled carriage module 51 and back 104 facing in the opposite rearward direction. With this arrangement, the assembly of wheeled carriage module 51 and pump module 52 may be wheeled about over the floor. Conveniently, handle 113 is located at an elevated location so as to be available to be taken up by hand to wheel the assembly of wheeled carriage module 51 and pump module 52 about over a floor.

Figure 14:
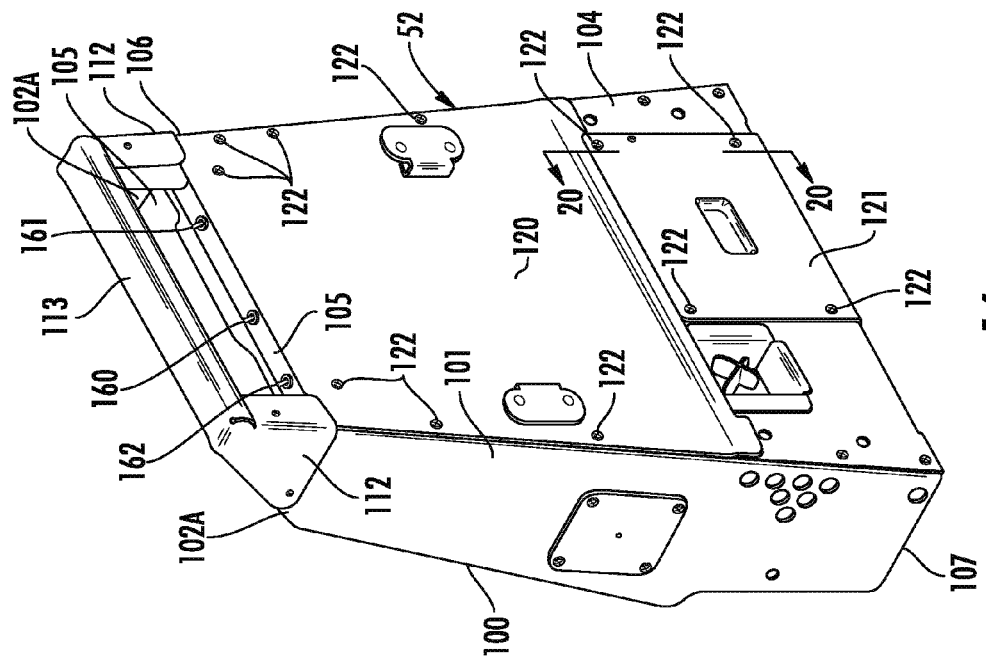
FIG. 14 is rear perspective view of the embodiment of FIG. 13.
Figure 16:
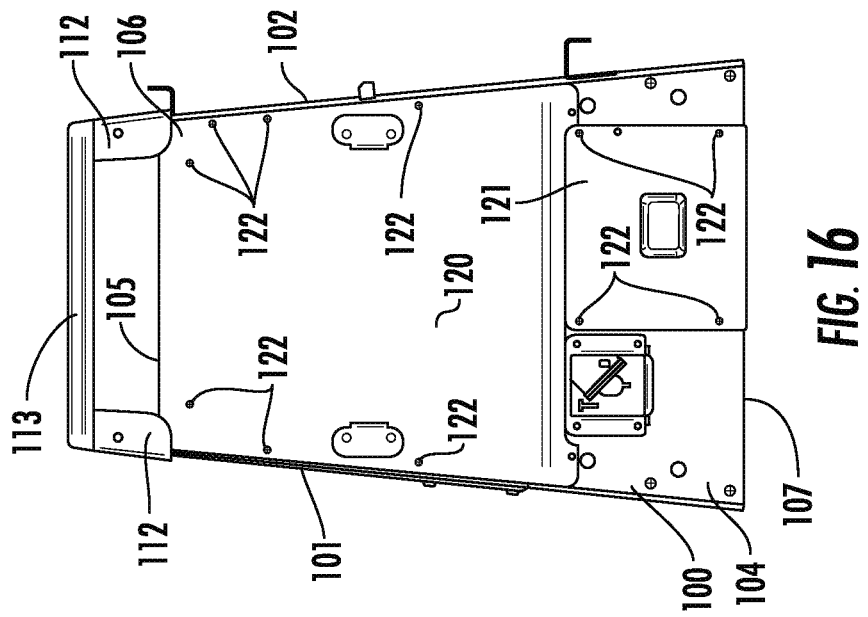
FIG. 16 is a rear elevation view of the embodiment of FIG. 13.

Referring to FIGS. 14 and 16, back 104 has two detachable covers 120 and 121. Cover 120 is considerably larger than cover 121. Cover 120 is an upper cover and extends between side sheets 101 and 102, and extends downwardly from upper end 105 of housing 100 to an intermediate location between upper and lower ends 105 and 106, and cover 121 is a lower cover located beneath cover 120 between lower end 107 and cover 120. Covers 120 and 121 are detachably connected to housing 100 with mechanical fasters in the form of threaded bolts 122 so as to be readily separable from housing 100.

Figures 17, 18:
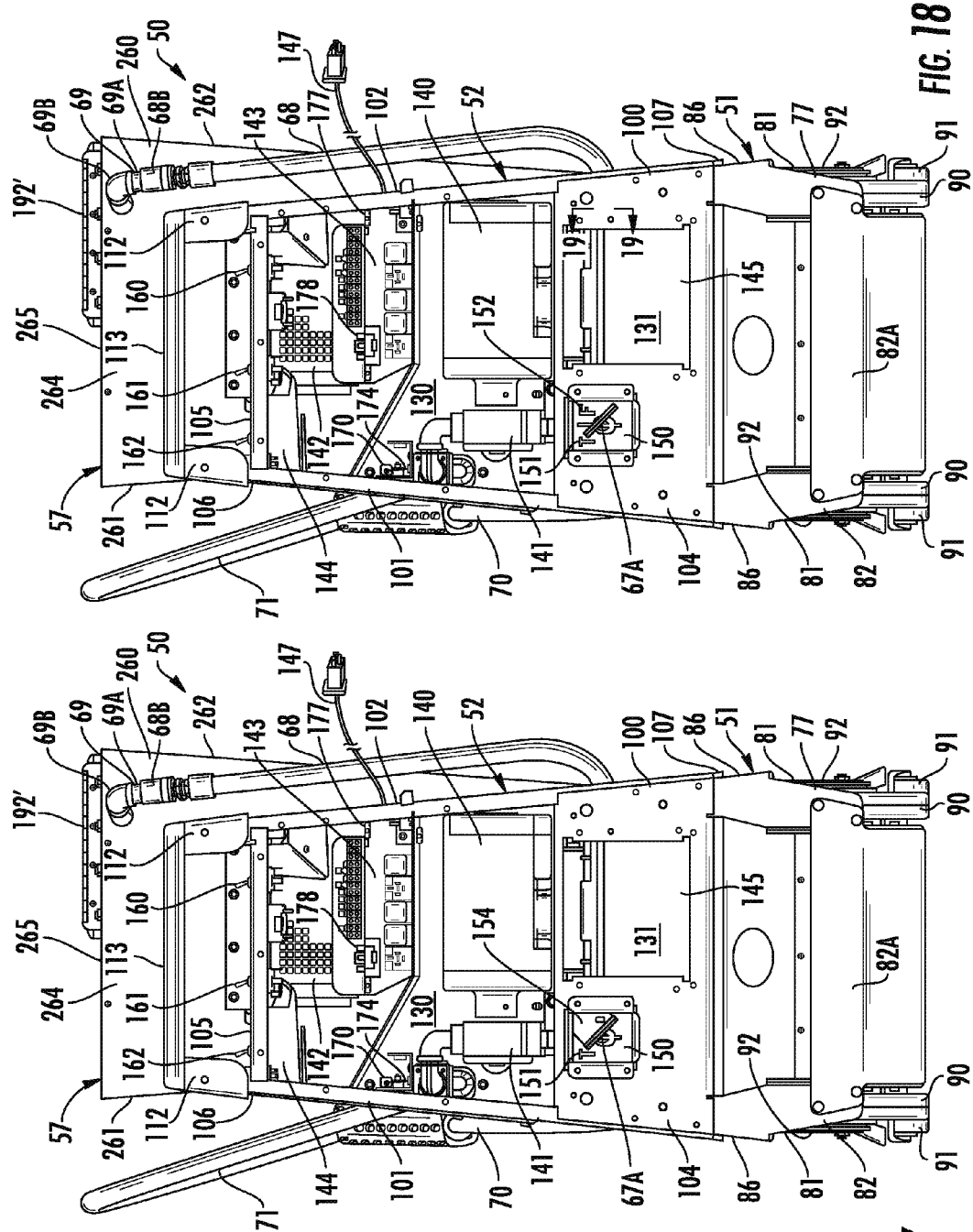
FIGS. 17 and 18 are rear elevation views of the embodiment of FIG. 7 illustrating covers of the pump module removed so as to show pump equipment housed within interior compartments of the pump module.

FIGS. 17 and 18 show back 104 of housing 100 of pump module 52 with covers 120 and 121 (not shown in FIGS. 17 and 18) detached from back 104 of housing 100 so as to illustrate the interior of housing 100 and the working parts of pump module 52 housed within the interior of housing 100. The removal of covers 120 and 121 from back 104 of housing reveals upper and lower compartments 130 and 131, respectively. Compartment 130, which is closeable with cover 120, houses a pump 140 operatively coupled to pump cooking oil through manifold 141 via conventional plumbing techniques well known to the skilled plumber, an AC/DC power supply 142, a relay switch board module 143, and a battery charger 144, all of which are mounted with conventional mounting hardware, such rivets and screws. Compartment 131, which is closeable with cover 121, houses a battery power source 145.

The AC/DC power supply 142 is conventionally wired to plugged power cord 147, which extends out from side sheet 102 of housing 100 and which is adapted to be conventionally plugged into a 120V outlet for providing system 50 with operational power. AC/DC power supply 142 is entirely conventional and takes the 120V AC power delivered by power cord 147 and converts it to a DC output of approximately 450 W to power relay switch board module 143, battery charger 144, and pump 140, all of which are electrically connected with conventional electrical wiring/connections well known to the skilled electrician.

Switches 160 and 161 at top 105 are system 50 operation switches and are electrically connected to pump 140 and battery charger 144 via relay switch board module 143, again with the use of conventional electrical wiring/connections well known to the skilled electrician. Battery charger 144 is a conventional 3-stage lead-acid gel charger with a 120 VAC input and 48 W output. Battery charger 144 is used to charge battery power source 145, which is a conventional and readily available rechargeable 12-V DC AH sealed lead acid gel battery. Switches 160 and 161 at top 105, illustrated in FIGS. 13, 14, 17, and 18, are conventional toggle switches. Switch 160 is an ON/OFF switch for pump module 52, and switch 161 is a pump switch for pump module 52 for activating and deactivating pump 140.

Figure 15:
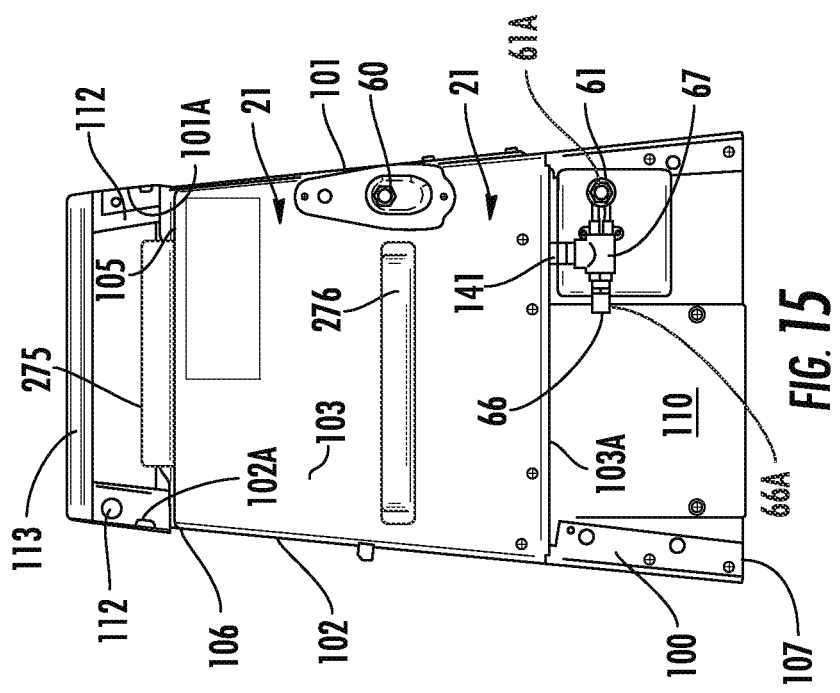
FIG. 15 is a front elevation view of the embodiment of FIG. 13.

Manifold 141 is a chamber that leads to cooking oil return outlet 60, cleaned cooking oil inlet 61 and fresh cooking oil inlet 66, illustrated in FIG. 15. Pump 140 is a conventional 12-V DC 1/3-HP electric pump, and is operatively coupled to pump cooking oil through manifold 141 from cooking oil return outlet 60, cleaned cooking oil inlet 61 and fresh cooking oil inlet 66. Cooking oil return outlet 60 is formed through an opening in front 103 of housing 100 near side sheet 101 between upper end 106 of housing 100 and marginal extremity 103A of front 103 of housing 100. Manifold 141 extends downwardly into pocket 110 in a direction toward lower end 107 of housing 100 near side sheet 101 to cleaned cooking oil inlet 61 and fresh cooking oil inlet 66, including valve 67 coupled therebetween. Valve 67 is coupled to, and operated by, a handle 67A located in a recess 150 in back 104 of housing 100, as shown in FIGS. 17 and 18. Valve 67 and handle 67A are entirely conventional, and handle is moved back and forth via rotation between the "T" 151 and the "F" 152 (FIG. 18) as desired so as to adjust and set valve 67 between its cleaned cooking oil setting corresponding to "T" 151 and its fresh cooking oil setting corresponding to "F" 152 (FIG. 18). "T" means "filter tank," whereas "F" means "fresh tank." When handle 67A moved into to "T" 151 corresponding to the cleaned cooking oil setting of valve 67, a stop bracket 154 may be releasably connected to back 104 in recess 150 with one or more releasable mechanical fasteners, such as one or more screws, to interfere with handle 67A so as to prevent handle 67A from being moved from the cleaned cooking oil setting corresponding to "T" 151 to the fresh cooking oil setting corresponding to "F" 152 (FIG. 18). To move permit movement of handle 67A from the "T" 151 position to the "F" 152 position for adjusting valve 67 from the cleaned cooking oil setting to the fresh cooking oil setting, stop bracket 154 need only be removed.

Pump module 52 operates both from a dedicated 120V power source, and from onboard battery power source 145. To operate pump module 52 from a dedicated 120V power source in what is a direct power mode of operation, power cord 147 is plugged into a conventional 120V electrical outlet. In this plugged condition or direct power mode of operation of pump module 52 of system 50, AC/DC power supply 142 is powered and enabled, which, in turn, powers relay switch board module 143 and power switch 160. Power switch 160 can be conventionally moved between OFF and ON positions. In the OFF position of power switch 160, pump switch 161 is disabled via relay switch board module 143 so as to be inoperative for activating and deactivating pump 140, and AC/DC power supply 142 powers battery charger 144 via relay switch board module 143, which, in turn, supplies recharging electrical power to battery power source 145. In the ON position of power switch 160, AC/DC power supply 142 powers pump switch 161 via relay switch board module 143 and pump switch 161 is enabled via relay switch board module 143 so as to be operative for activating pump 140 for cooking oil pumping purposes and deactivating pump 140 by moving pump switch 161 conventionally between ON and OFF positions, and AC/DC power supply 142 powers battery charger 144 via relay switch board module 143, which, in turn, supplies recharging electrical power to battery power source 145.

To operate pump module 52 from battery power source 145 in a battery power mode of operation of pump module 52 of system 50, power cord 147 is unplugged from a conventional 120V electrical outlet. In this unplugged condition, AC/DC power supply 142 is unpowered and thereby disabled which, in turn, disables battery charger 144, and battery power source 145 powers relay switch board module 143 and power switch 160 with battery power. Power switch 160 can be conventionally moved between OFF and ON positions in this configuration. In the OFF position of power switch 160, pump switch 161 is disabled via relay switch board module 143 so as to be inoperative for activating and deactivating pump 140. In the ON position of power switch 160, battery power source 145 powers pump switch 161 with battery power via relay switch board module 143 and pump switch 161 is enabled via relay switch board module 143 so as to be operative for activating pump 140 for cooking oil pumping purposes and deactivating pump 140 by moving pump switch 161 conventionally between ON and OFF positions.

Pump module 52 also has a pump back-flush switch 162 at top 105, which is a conventional spring-loaded depression switch that is electrically connected to pump 140 and via relay switch board module 143, again with the use of conventional electrical wiring/connections well known to the skilled electrician. In the OFF position of power switch 160 in both the direct power and battery power modes of operation of pump module 52 of system 50, pump back-flush switch 162 is disabled via relay switch board module 143 so as to be inoperative for activating and deactivating pump 140 for pump back-flushing. In the ON position of power switch 160 in both the direct power and battery power modes of operation of pump module 52 of system 50, AC/DC power supply 142 powers pump back-flush switch 162 via relay switch board module 143 and pump back-flush switch 162 is enabled via relay switch board module 143 so as to be operative for activating pump 140 for cooking oil back-flush pumping purposes and deactivating pump 140 by moving pump back-flush switch 162 conventionally between depressed ON and un-depressed OFF positions. Back-flushing pump via the operation of pump back-flush switch 162 allows pump 140 to be back-flushed as needed should it become clogged or obstructed with debris.

Figure 19:
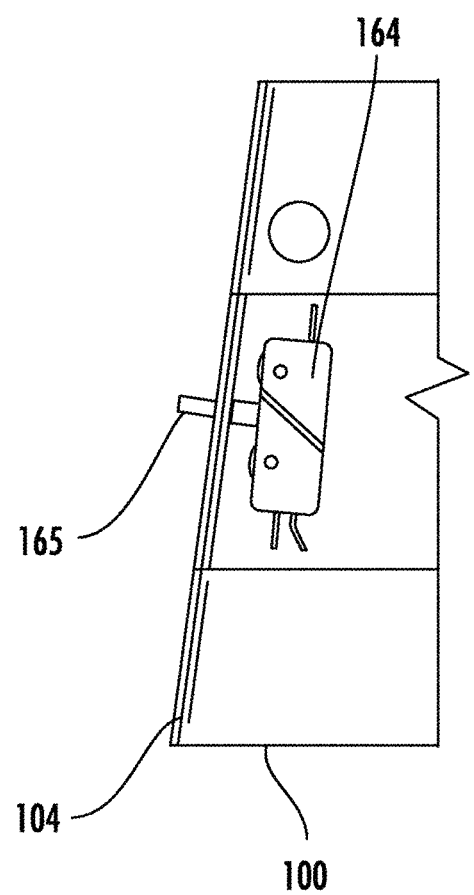
FIG. 19 is a section view taken along line 19-19 of FIG. 18.
Figure 20:
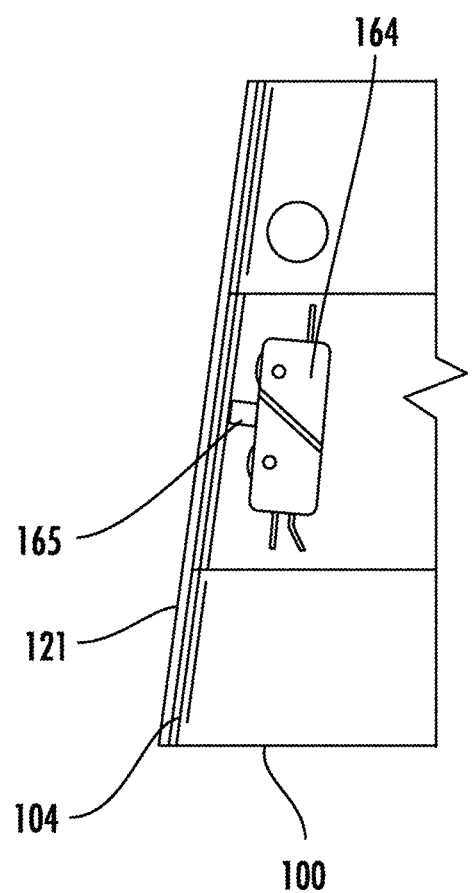
FIG. 20 is a section view taken along line 20-20 of FIG. 14.

Compartment 131 housing battery power source 145 is closeable with detachable cover 121, as previously explained. Keeping compartment 131 containing battery power source 145 closed is important for safety purposes, namely, for preventing electrical shock due to the inadvertent contact with the active electrical contacts of battery power source 145 during the use of pump module 52. For safety purposes in reference to FIGS. 18 and 19, a cover kill switch 164 is operatively coupled between the detachable cover and pump 140 via relay switch board module 143 for enabling pump 140 in response to a competent closure of compartment 131 housing battery power source 145 with detachable cover 121, and for disabling pump 140 in response to a competent closure of compartment 131 with detachable cover 121. Cover kill switch 164 is an entirely conventional kill switch conventionally electrically connected via wiring to relay switch board module 143, and is located within the interior of housing 100 on one side of compartment 131. Looking to FIGS. 19 and 20, a spring-loaded plunger 165 of kill switch 164 projects outwardly through an opening in back 104 of housing 100. When cover 121 is detached from housing 100, plunger 165 is extended and is not fully depressed as in FIG. 19, and this defines an incompetent closing of compartment 131 with cover 121 and a potentially unsafe condition to operate pump module 52 safely, whereby a kill switch circuit of kill switch 164 between kill switch 164 and pump 140 is open thereby disabling pump 140 so as to prevent pump 140 from being operated via pump switch 161. When cover 121 is attached to back 104 of housing with fasteners 122, cover 121 is sized so as to be applied over plunger 165 and directly contacts plunger 165 so as to be able to depress plunger 165. When cover 121 is attached to back 104 of housing 100 with fasteners 122 but is not sufficiently or fully attached so as to leave plunger 165 not fully depressed, this also defines an incompetent closing of compartment 131 with cover 121 and a potentially unsafe condition to operate pump module 52 safely, whereby the kill switch circuit of kill switch 164 between kill switch 164 and pump 140 is still open thereby disabling pump 140 so as to prevent pump 140 from being operated via pump switch 161. When cover 121 is attached to back 104 of housing with fasteners 122 and is sufficiently or fully attached so as to fully depress plunger 165 as in FIG. 20, this defines a competent closing of compartment 131 with cover 121 and a safe condition to operate pump module 52 safely, whereby the kill switch circuit of kill switch 164 between kill switch 164 and pump 140 is closed thereby enabling pump 140 so as to allow pump 140 to be activated and deactivated via pump switch 161.

As explained above, pump module 52 has cooking oil return outlet 60 coupled in fluid communication to cleaned cooking oil inlet 61 via manifold 141. Cleaned cooking oil inlet 61 is, in turn, configured to be removably coupled in fluid communication to cleaned cooking oil outlet 64 of filtering module 53 via a cleaned cooking oil conduit or hose 65 so as to form filtering cooking oil flow pathway through filtering module 53 and through hose 65 and then through manifold 141 of pump module 51 from cleaning cooking oil inlet 61 to cooking oil return outlet 60. Hose 65 is conventional food-grade hose formed of soft flexible plastic. Pump 140 of pump module 52 is used to generate a flow of used cooking oil through the described filtering cooking oil flow pathway via pumping in the cleaned cooking oil setting of valve 67. Cooking oil return outlet 60 is also coupled in fluid communication to fresh cooking oil inlet 66 via manifold 141. Fresh cooking oil inlet 66 of pump module 52 is configured to be removably coupled in fluid communication to fresh cooking oil module 57 via fresh oil conduit or hose 68 so as to form the fresh cooking oil flow pathway from fresh cooking oil module 57 through hose 68 and through manifold 141 of pump module 2 from fresh cooking oil inlet 66 to cooking oil return outlet 60. Hose 68 is conventional food-grade hose formed of soft flexible plastic. Pump 140 of pump module 52 used to generate a flow of used cooking oil through the described filtering cooking oil flow pathway via pumping in the fresh cooking oil setting of valve 67.

Figure 2:
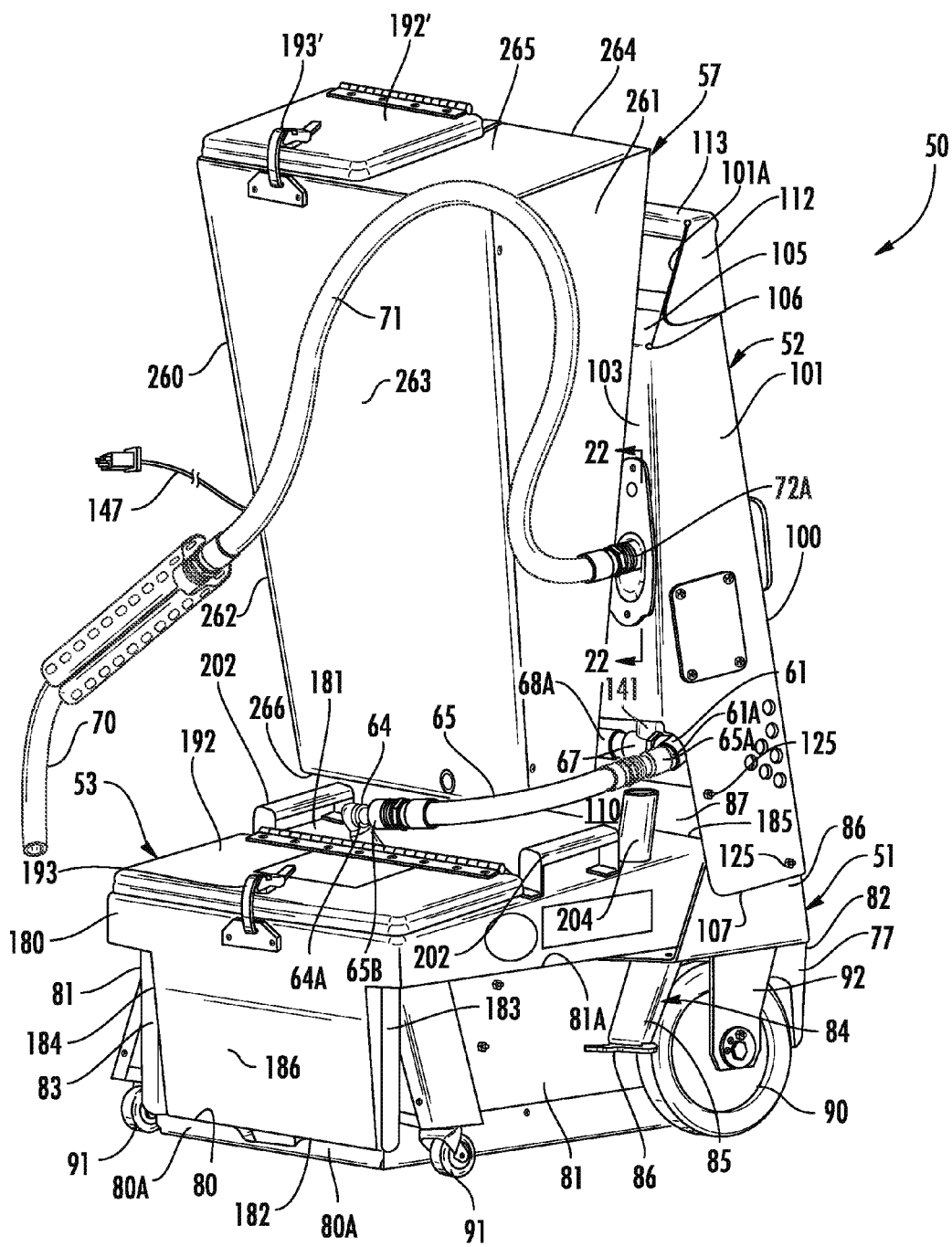
FIG. 2 is a front, left side perspective view of the system of FIG. 1 shown as it would appear assembled with the pump module removably coupled to the wheeled carriage module, the cooking oil filtering module rested on the wheeled carriage module, and the fresh cooking oil module rested on the pump module.

Cooking oil return outlet 60 of pump module 52 is configured to be removably coupled in fluid communication to cooking oil delivery wand 70 via a cooking oil return conduit or hose 71, as shown in FIGS. 2 and 4-6, for applying cleaned cooking oil to a deep fat fryer via wand 70 in the cleaned cooking oil setting of valve 67, and for applying fresh cooking oil to a deep fat fryer via wand 70 in the fresh cooking oil setting of valve 67, as previously explained in connection with FIG. 1. Hose 71 is conventional food-grade hose formed of soft flexible food-grade silicone. Looking to FIGS. 1, 2, 4, and 6, cooking oil return outlet 60 is a conventional pipe fitting 60A. The free ends of hose 71 are formed with identical and conventional hose fittings 72A and 72B, and wand 70 is, in turn, formed with a conventional pipe fitting 70A. Pipe fittings 60A and 70A are conventional male pipe fittings, and hose fittings 72A and 72B are conventional, corresponding female hose fittings. Hose fitting 72A of hose 71 is considered an outtake hose fitting, and is configured to be conventionally removably coupled in fluid communication to pipe fitting 60A of pump module 52, as shown in FIGS. 2, 4 and 6, for coupling cooking oil return outlet 60 in fluid communication to hose 71, and hose fitting 72B is configured to be conventionally removably coupled in fluid communication to pipe fitting 70A of wand 70, as shown in FIGS. 2, 4, and 6, for coupling wand 70 in fluid communication to hose 71.

Figure 21:
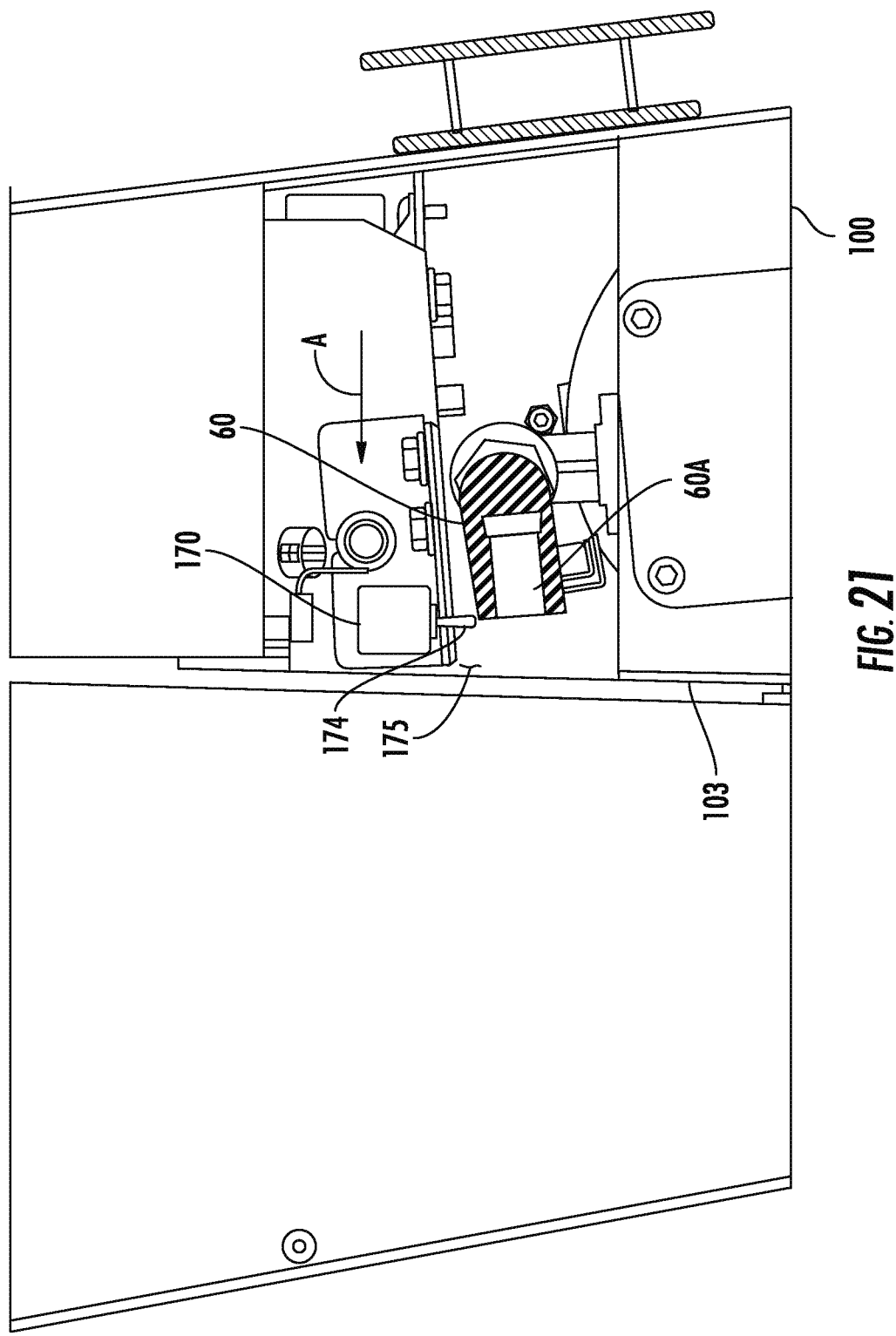
FIG. 21 is a section view taken along line 21-21 of FIG. 15.
Figure 22:
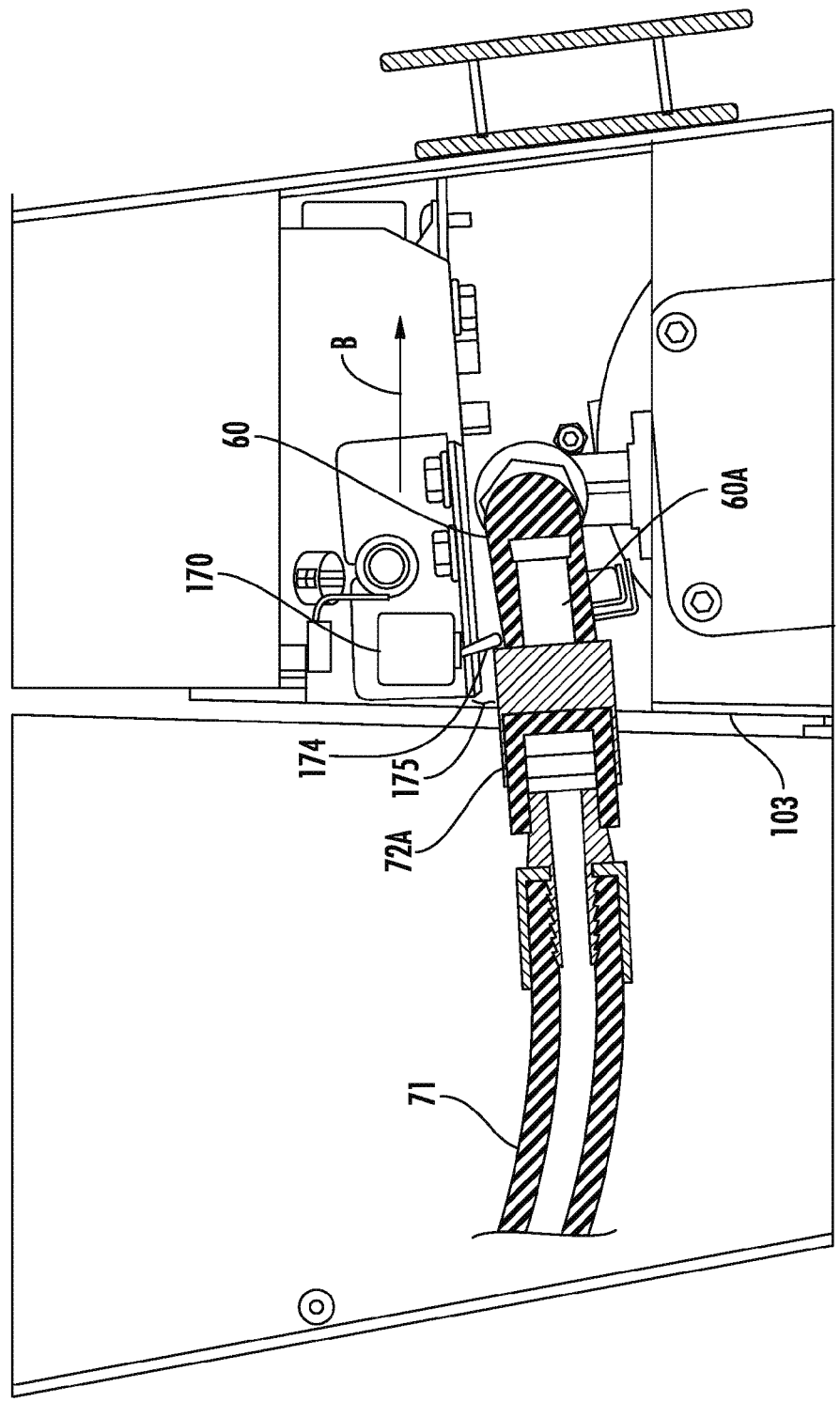
FIG. 22 is a section view taken along line 22-22 of FIG. 2.

Ensuring that hose fitting 72A is properly coupled in fluid communication to pipe fitting 60A of cooking oil return outlet 60 is important for safety purposes, namely, for preventing cooking oil from spilling from cooking oil return outlet 60 during cooking oil pumping operations with pump module 52. For safety purposes in reference to FIGS. 17, 18, 20 and 21, a fitting kill switch 170 is operatively coupled between pipe fitting 60A of cooking oil return outlet 60 and pump 140 via relay switch board module 143 for enabling pump 140 in response to a competent coupling between hose fitting 72A of hose 71 and pipe fitting 60A of cooking oil return outlet 60, and for disabling pump 140 in response to an incompetent coupling between hose fitting 72A of hose 71 and pipe fitting 60A of cooking oil return outlet 60. Fitting kill switch 170 is an entirely conventional kill switch conventionally electrically connected via wiring to relay switch board module 143, and is located within the interior of housing 100 near cooking oil return outlet 60. Looking to FIGS. 21 and 22, a spring-loaded tab 174 of kill switch 164 projects downwardly toward pipe fitting 60A of cooking oil return outlet 60 at opening 175 formed in front 103 of housing 100 through which pipe fitting 60A extends. When hose fitting 72A is detached from pipe fitting 60A, tab 174 is extends forwardly in the direction of arrowed line A in FIG. 21 and is not fully depressed as in FIG. 22, and this defines an incompetent coupling of hose fitting 72A to pipe fitting 60A and a potentially unsafe condition to operate pump module 52 safely, whereby a kill switch circuit of kill switch 170 between kill switch 170 and pump 140 is open thereby disabling pump 140 so as to prevent pump 140 from being operated via pump switch 161. When hose fitting 72A is coupled to pipe fitting 60A, tab 174 is located to interact with hose fitting 72A via direct contact as shown in FIG. 22 so as to be able to depress tab 174 in the direction of arrowed line B in FIG. 22. When hose fitting 72A is coupled to pipe fitting 60A but is not sufficiently or fully coupled so as to leave tab 174 not fully depressed as in FIG. 22, this also defines an incompetent closing of hose fitting 72A to pipe fitting 60A and a potentially unsafe condition to operate pump module 52 safely because of the possibility of cooking oil leaking between hose fitting 72A and pipe fitting 60A, whereby the kill switch circuit of kill switch 170 between kill switch 170 and pump 140 is still open thereby disabling pump 140 so as to prevent pump 140 from being operated via pump switch 161. When hose fitting 72A is coupled to pipe fitting 60A and is sufficiently or fully coupled so as to fully depress tab 174 as in FIG. 22, this defines a competent coupling of hose fitting 72A to pipe fitting 60A ensuring a leak-proof coupling between hose fitting 72A and pipe fitting 60A and a safe condition to operate pump module 52 safely, whereby the kill switch circuit of kill switch 170 between kill switch 170 and pump 140 is closed thereby enabling pump 140 so as to allow pump 140 to be activated and deactivated via pump switch 161.

Cleaned cooking oil inlet 61 of pump module 52 is configured to be removably coupled in fluid communication to filtering module 53 via cleaned cooking oil conduit or hose 65, as shown in FIGS. 2 and 4-6, for applying cooking oil cleaned via filtering from filtering module 53 to pump module 52 through manifold 141 from cleaned cooking oil inlet 61 to cooking oil return outlet 60 in the cleaned cooking oil setting of valve 67 for application of cleaned cooking oil to wand 70 via hose 71 coupled in fluid communication between cooking oil return outlet 60 and wand 70. Looking to FIGS. 1 and 2, cleaned cooking oil inlet 61 of pump module 53 is a conventional pipe fitting 61A. The free ends of hose 65 are formed with identical and conventional hose fittings 65A and 65B, and cleaned cooking oil outlet 64 of filtering module 53 is, in turn, a conventional pipe fitting 64A. Pipe fittings 61A and 64A are conventional male pipe fittings, and hose fittings 65A and 65B are conventional, corresponding female hose fittings. Hose fitting 65A of hose 65 is considered an intake hose fitting, and is configured to be conventionally removably coupled in fluid communication to pipe fitting 61A of pump module 52, as shown in FIGS. 2 and 22, for coupling cleaned cooking oil inlet 61 in fluid communication to hose 65, and hose fitting 65B is configured to be conventionally removably coupled in fluid communication to pipe fitting 64A of filtering module 53, as shown in FIGS. 2, 3, and 5, for coupling filtering module 53 in fluid communication to hose 65.

Fresh cooking oil inlet 66 of pump module 52 is configured to be removably coupled in fluid communication to fresh cooking oil module 57 via fresh cooking oil conduit or hose 68, as shown in relevant part in FIGS. 2-4, for applying fresh cooking oil from fresh cooking oil module 57 to pump module 52 through manifold 141 from fresh cooking oil inlet 66 to cooking oil return outlet 60 in the fresh cooking oil setting of valve 67 for application of fresh cooking oil to wand 70 via hose 71 coupled in fluid communication between cooking oil return outlet 60 and wand 70. Looking to FIGS. 1 and 2-4 in relevant part, fresh cooking oil inlet 66 of pump module 53 is a conventional pipe fitting 66A. The free ends of hose 68 are formed with identical and conventional hose fittings 68A and 68B, and fresh cooking oil outlet 69 of fresh cooking oil module 57 is, in turn, a conventional pipe fitting 69A, which is coupled in fluid communication to the interior volume of fresh cooking oil module 57 with a pipe or conduit 69B. Pipe fittings 66A and 69A are conventional male pipe fittings, and hose fittings 68A and 68B are conventional, corresponding female hose fittings. Hose fitting 68A of hose 68 is considered an intake hose fitting, and is configured to be conventionally removably coupled in fluid communication to pipe fitting 66A of pump module 52, for coupling fresh cooking oil inlet 66 in fluid communication to hose 68, and hose fitting 68B is configured to be conventionally removably coupled in fluid communication to pipe fitting 69A of fresh cooking oil module 57 for coupling fresh cooking oil module 57 in fluid communication to hose 68.

In regards to FIG. 3, a solar panel port 177 is formed through side sheet 102 of housing 100, and which is also shown in FIGS. 17 and 18. This solar panel port 177 is operatively coupled to battery power source 145 shown in FIGS. 17 and 18 via relay switch board module 143 to supply recharging electrical power to battery power source 145 from a conventional, portable solar panel plugged into solar panel port 177. This provides another option for recharging battery power source 145 rather that plugging power cord 147 into an electrical outlet. For this to work, of course, the solar panel will need to be exposed to solar radiation, as is well known.

§C. The Filtering Module

Figure 29:
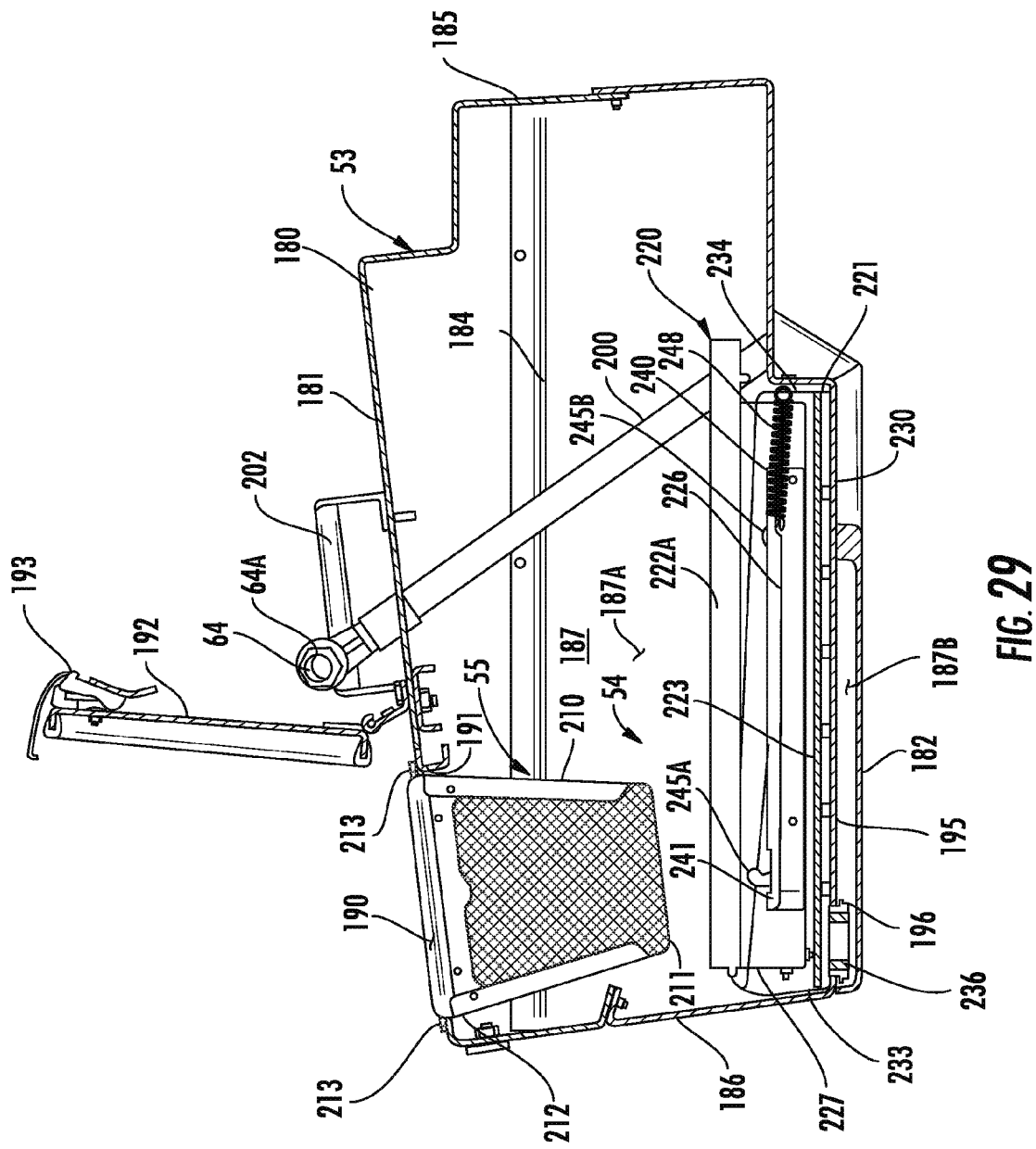
FIG. 29 is a view similar to that of FIG. 25 illustrating the filter system, first illustrated in FIG. 1, as it would appear installed within the interior of the cooking oil filtering module with the lid shown as it would appear open as in FIG. 27.

Looking now in relevant part to FIGS. 23-30, filtering module is self-contained and consists of a container 180 and filter system 54 first referenced in FIG. 1. Container 180 is fashioned of sheet metal, such as aluminum or steel sheet metal, the various parts of which are bent to shape and fastened together with welding and/or rivets. Container 180 is made up of wall components including a top 181 and an opposed bottom 182, and opposed sides 183 and 184 that extend between a back 185 and an opposed front 186, all of which cooperate to define a volume 187. An inlet 190 to volume 187 is formed in top 181 near front 186. Inlet 190 is encircled and defined by a surrounding lip 191. Inlet 190 can be opened and closed with a hinged lid 192, and which can be locked when closed with a conventional latch 193. FIGS. 27-29 show hinged lid 192 as it would appear open so as to open inlet 190, and FIGS. 23-26, and 30 show hinged lid 192 as it would appear closed closing inlet 190 and also locked with latch 193.

Volume 187 is divided into an upper volume 187A and a lower volume 187B by a horizontal, intermediate floor 195 located near and above bottom 182. Intermediate floor 195 is formed with a drain 196 near front 186, which couples upper volume 187A to lower volume 187B in fluid communication. The filtering cooking oil flow pathway through filtering module 53 extends from inlet 190 and through upper volume 187A of volume 187 to drain 196, and through drain 196 to lower volume 187B of volume 187 to conduit 200, and through conduit 200 from lower volume 187B of volume 187 to cleaned cooking oil outlet 64. Upper volume 187A is considerably larger than lower volume 187B. As such, volume 187A is considered a major volume of volume 187 and volume 187B is considered a minor volume of volume 187. A conduit 190 is coupled in fluid communication between lower volume 187B at an intermediate location between back 185 and front 186, and cleaned cooking oil outlet 64 located along the outer side of top 181 between hinged lid 192 and back 184. Conduit 190 extends upwardly from lower volume 187B through top 181 to cleaned cooking oil outlet 64, which is a conventional pipe fitting 64A. Opposed, exterior handles 202 are formed on top 181 near either side of container 180 between hinged lid 192 and back 185, which may be taken up by hand to carry container 180 about as needed. An upstanding receiver 204 is formed in top 181 of container 180 near side 183, which is used to receive and hold the end of wand 70 for temporary storage during periods of nonuse, as is shown in FIGS. 4 and 5, and which is removed from receiver 204 as in FIG. 2 for use in directing cooking oil into a deep fat fryer in the use of system 50.

Figure 32:
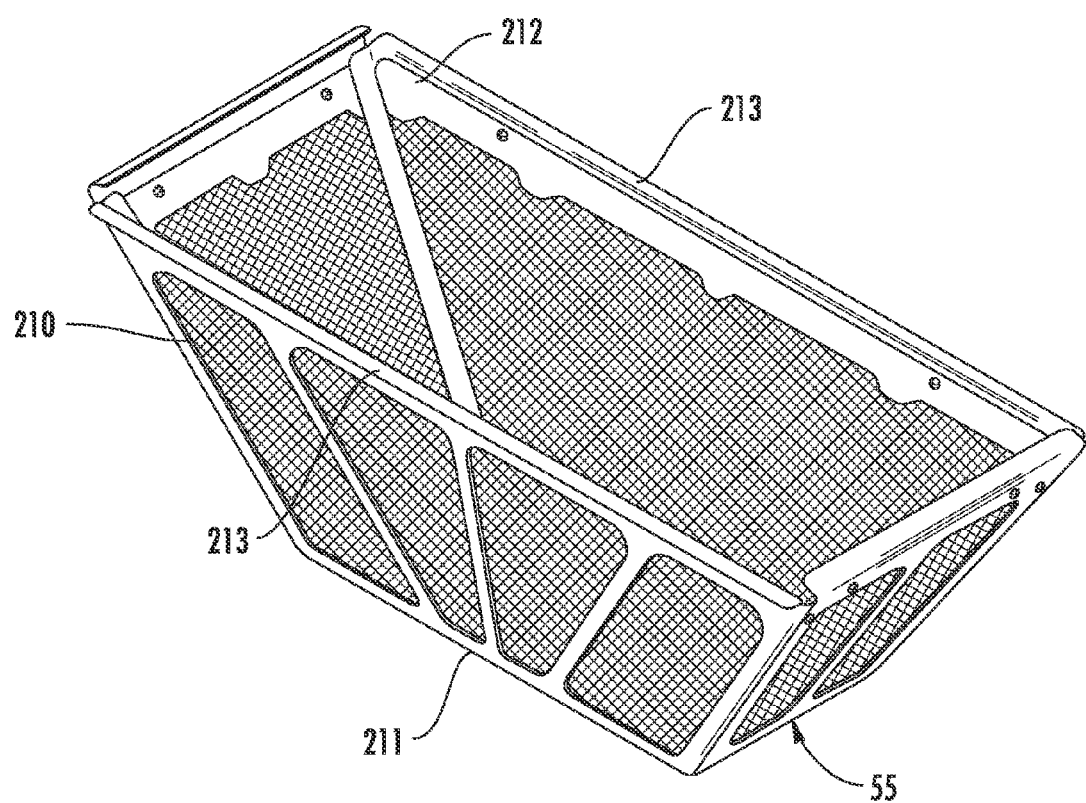
FIG. 32 is a perspective view of the pre-filter of the filter system first illustrated in FIG. 1.

Container 180 holds filter system 54, which is used to clean via filtering used cooking oil applied through the filtering cooking oil flow pathway of filtering module 53, which extends from inlet 190 and through upper and lower volumes 187A and 182B and through conduit 200 to cleaned cooking oil outlet 60. Filter system 54 includes pre-filter 55 and separator filter assembly 56, first illustrated in FIG. 6. Looking to FIG. 32, pre-filter 55 is sieve 210 in the form of a meshed or screened strainer basket for straining cooking oil, i.e., for separating for removing large debris and gross solid contaminants from cooking oil. Sieve 210 has a bottom 211 and an opposed top 212 formed with opposed outwardly-directed flanges 213 used to rest sieve basket 210 on opposite sides of the surrounding lip 191 encircling and defining inlet 190 to volume 187. In a preferred embodiment, sieve 210 is a 300 micron strainer basket.

Figure 33:
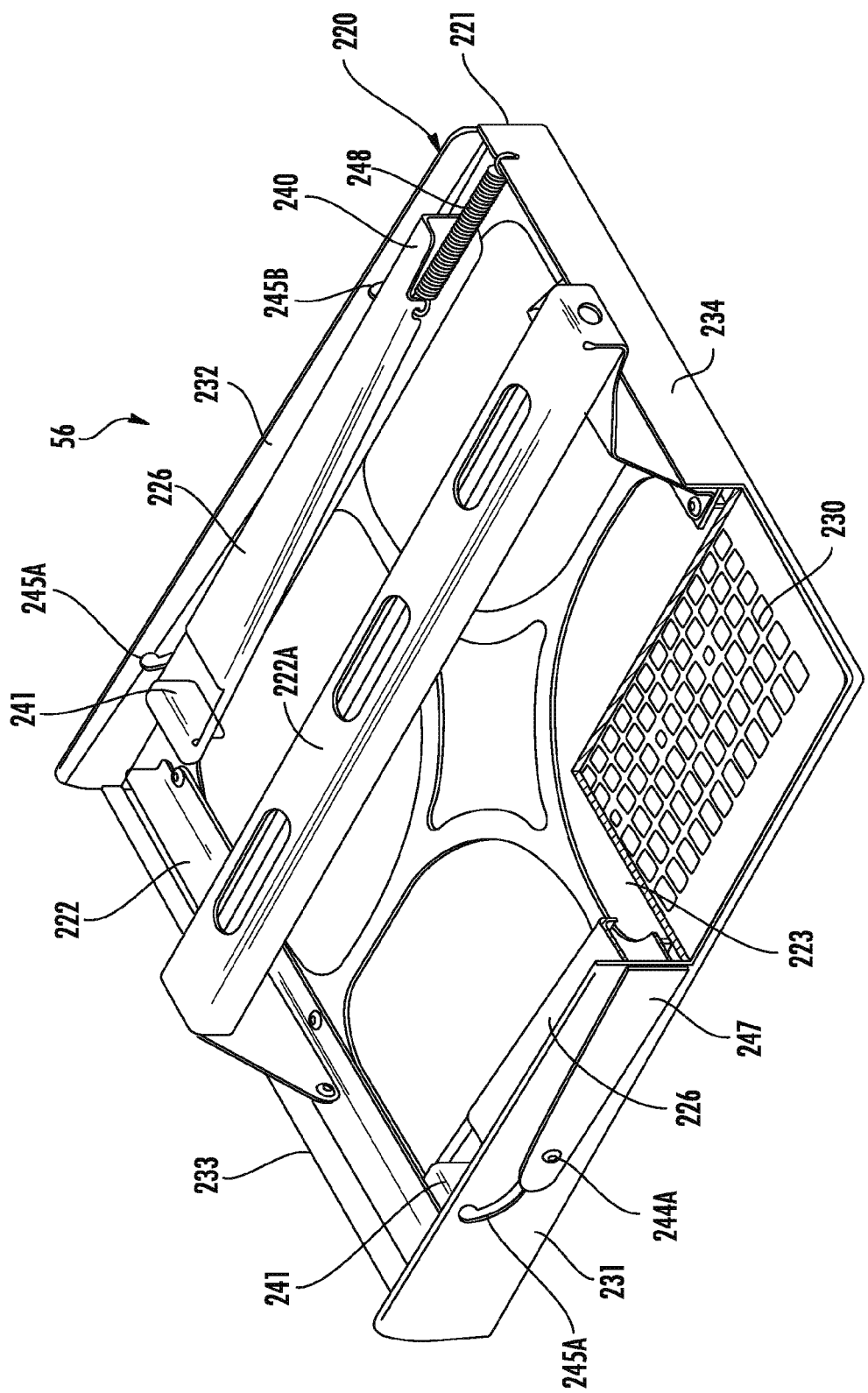
FIG. 33 is a perspective view of the separator filter assembly of the filter system first illustrated in FIG. 1, with portions thereof being broken away for illustrative purposes, the separator filter assembly including a filter tray assembly consisting of a filter tray and a handled frame, and a separator filter held between the filter tray and the handled frame, with spring-loaded braces of the filter tray shown as they would appear in braced positions bracing the handled frame against the separator filter so as to hold the separator filter in place.

FIG. 33 is a perspective view of the separator filter assembly 56 of filter system 54, with portions thereof being broken away for illustrative purposes. Separator filter assembly 56 includes a filter tray assembly 220 consisting of a filter tray 221 and a frame 222, and a separator filter 223 held between filter tray 221 and frame 222. Separator filter 223 is a conventional pad filter through which used cooking oil is passed to remove suspended impurities/solids, preferably having a minimum particle size of ½-20 microns, from the used cooking oil so as to clean the used cooking oil via filtering. Frame 222 is formed with an attached handle 222A, such as for taking up and carrying frame 222 and for taking up and carrying separator filter assembly 56 when assembled. As such, frame 222 is considered a handled frame. Filter tray 221 has opposed spring-loaded braces 226 used to brace frame 222 against separator filter 223 so as to hold separator filter 223 in place to filter tray 221. Braces 226 are spring-loaded and are configured to extend toward frame 222 so as to urge frame 222 to separator filter 223 applied to filter tray 221.

Looking to FIGS. 33-40 in relevant part, filter tray 221 of filtering tray assembly 220 is a metal container having a flat perforated bottom 230 that extends between opposed upstanding sides 231 and 232, and opposed upstanding front and rear ends 233 and 234. A central drain 236 is formed in perforated bottom 230 near front end 233 of filter tray 221, as shown in FIG. 40, which is a section view taken along line 40-40 of FIG. 39. Sides 231 and 232 are each fashioned with a brace 226. Braces 226 are identical, each being elongate and having an outer end 240 directed toward rear end 234 and an opposed handled inner end 241 directed toward front end 233. Braces 226 are positioned along the inner surfaces of sides 221 and 222, respectively, above perforated bottom 230, and extend along most of the entire length of sides 221 and 222 from outer ends 240 near rear end 235 of filter tray 221, to handled inner ends 241 near front end 233 of filter tray 221.

Forward and rearward pins 244A and 244B extend through corresponding forward and rearward slots 245A and 245B formed through sides 221 and 222, respectively, and extend between and connect the respective braces 226 positioned along the inner surfaces of sides 221 and 222 to corresponding straps 247 positioned along the outer surfaces of sides 221 and 222. Slots 245A and 245B are down-angled in a direction from front end 233 of filter tray 221 to rear end 234 of filter tray 221, as best shown in FIGS. 38 and 39, and pins 244A and 244B are free to run along the lengths of slots 245A and 245B, respectively, to permit movement of braces 226 between braced or lowered positions in a direction toward rear end 234 of filter tray 221 and toward frame 222 and perforated bottom 230 of filter tray 221, as shown in FIG. 37 for bracing handled frame 22 against separator filter 223 so as to hold separator filter 223 in place to perforated bottom 230 of filter tray 221 as shown in FIG. 33, and unbraced or raised positions in a direction toward front end 233 filter tray 221 and away front frame 222 and perforated bottom 230 of filter tray 221, as shown in FIG. 36, to permit the installation and removal of separator filter 223 and handled frame 22 to and from filter tray 221 from front end 233 of filter tray 221. FIG. 38 is a side elevation view of the embodiment of FIG. 36 looking in the direction of side 231, with strap 247 shown in phantom outline so as to illustrate the position of pins 244A and 244B in slots 245A and 245B in the raised/unbraced position of the corresponding brace toward front end 233 of filter tray 221. FIG. 39 is a side elevation view of the embodiment of FIG. 37 looking in the direction of side 231, with strap 247 shown in phantom outline so as to illustrate the position of pins 244A and 244B in slots 245A and 245B in the lowered/braced position of the corresponding brace toward rear end 234 of filter tray 221.

Figure 34:
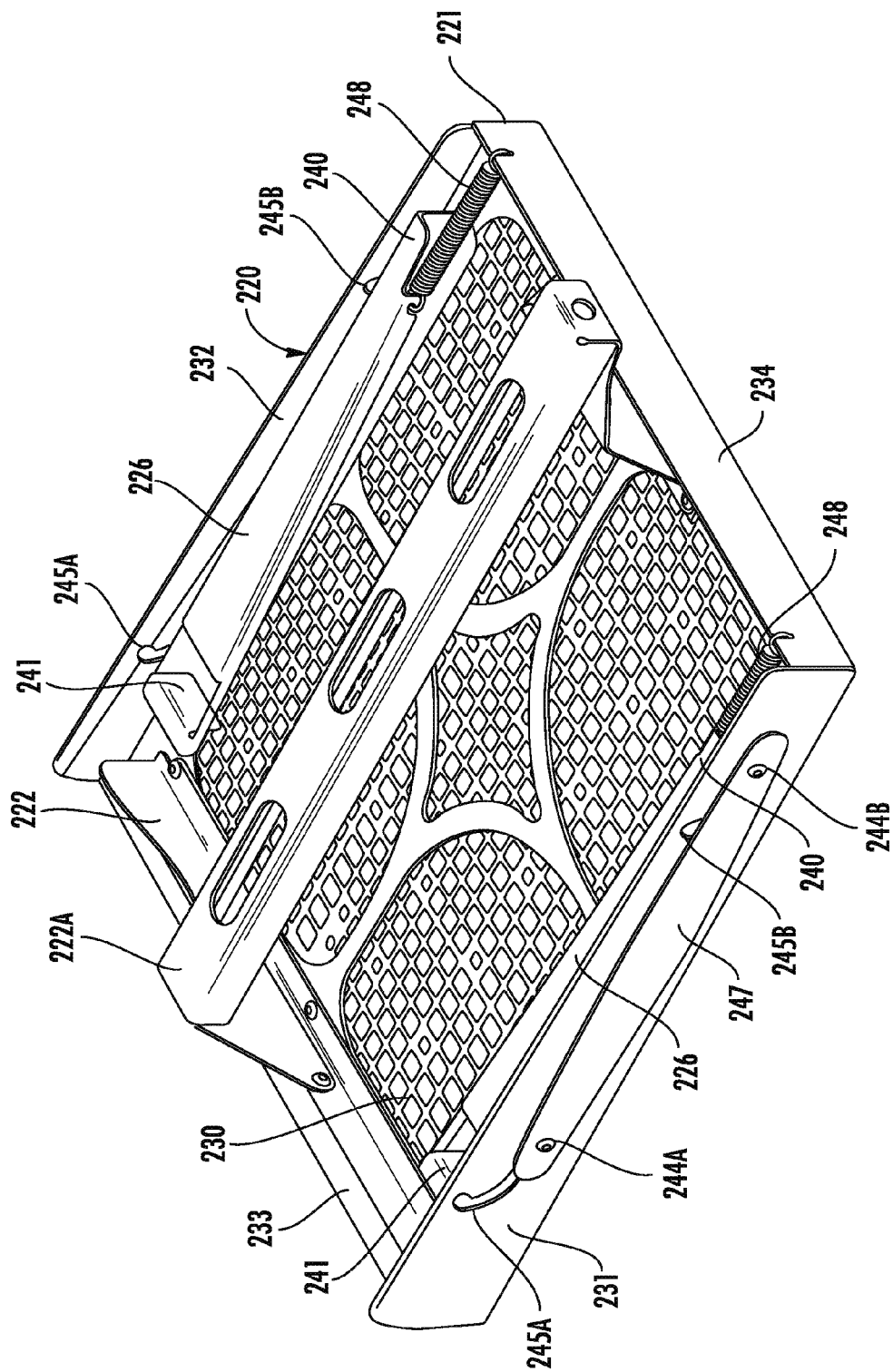
FIG. 34 is a perspective view of the filter tray assembly of FIG. 3 shown as it would appear without the separator filter.
Figure 35:
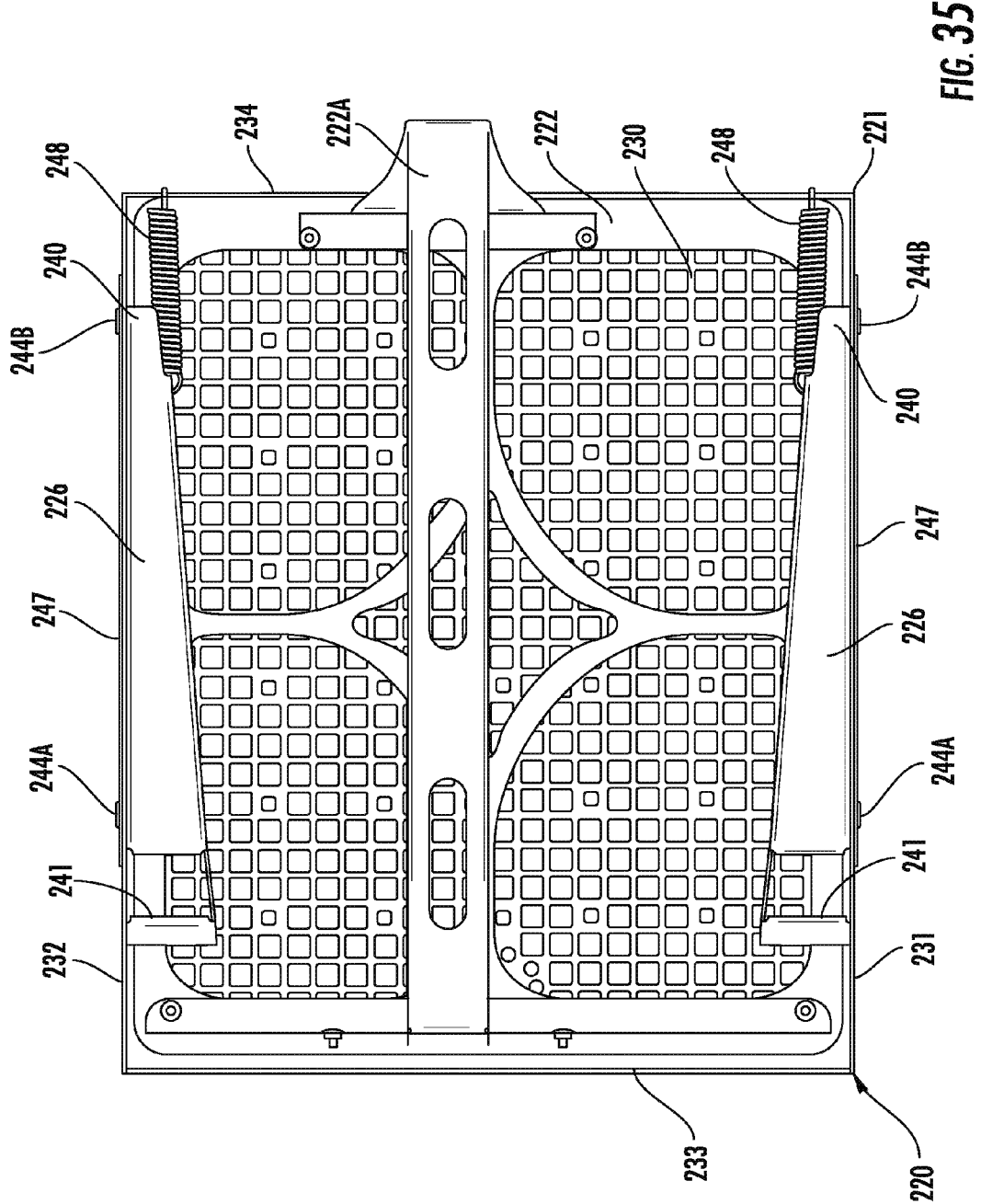
FIG. 35 is a top plan view of the embodiment of FIG. 34.

Springs 248 connected between outer ends 240 of braces 226, respectively, and rear end 234 of filter tray 221 function to spring-load the braces 226 so as to bias braces 226 into their lowered/braced positions toward rear end 234 of filter tray 221. To move braces 226 from their lowered/braced positions to their raised/unbraced positions, one need only take up braces 226 at inner handled ends 241, such as by hand, and pull on braces 226 with a force sufficient to overcome the bias applied by springs 248. The upper forward areas of the pair of opposed slots 245A in sides 231 and 232 of filter tray 221 near front end 233 of filter tray 221 are in-turned toward rear end 234 of filter tray 221, which accept the corresponding pins 244A to temporarily hold braces 226 in their raised/unbraced positions. FIG. 38 shows one such pin 244A as it would appear applied into the described in-turned portion of slot 245A. When pins 244A are in these in-turned portions of slots 245A, respectively, springs 248 act on braces 226 urging pins 244A in said in-turned portions of slots 245A, respectively, so as to hold and maintain braces in their raised/unbraced positions. To move braces 226 from their raised/unbraced positions to their lowered/braced positions, one need only take up inner handled ends 241, such as by hand, and briefly pull on inner handled ends 241 in the direction toward front end 233 with a force sufficient to overcome the bias applied by springs 248 to initially remove pins 244A from the above-described in-turned portions of slots 245A, respectively. At this point, braces 226 may be released to allow the bias supplied by springs 248 urge/pull braces 226 toward rear end 234, whereby pins 244A and 244B run downwardly along slots 245A and 245B, respectively, so as to move braces 226 from their raised/unbraced positions as shown in FIG. 36 to their lowered/braced positions as shown in FIGS. 33 and 34. Springs 248 are compression springs in a preferred embodiment each having an outer tag end hooked onto rear end 234 of filter tray 221 and an opposed inner tag end hooked onto the outer end 240 of the corresponding brace 226. Although springs 248 are preferably compression springs, any spring form capable of providing the described bias against braces 226 can be used without departing from the invention.

To install separator filter 223 and frame 222 to filter tray 221, braces 226 are moved into their raised/unbraced positions away from perforated bottom 230 as shown in FIG. 36. Separator filter 223 is inserted onto perforated bottom 230 from front end 233 of filter tray 221 between front end 233 and braces 226, and then frame 222 is inserted handle 222A up onto separator filter 223 from front end 233 of filter tray 221 between front end 233 and braces 226. At this point, braces 226 are moved from their raised/unbraced positions to their lowered/braces positions against the opposed sides of frame 222 as shown in FIG. 33, whereby the spring-loaded configuration of braces 226 cause braces 226 to extend toward and against the opposed sides of frame 222 in the lowered/braced positions of braces 226 so as to urge frame 222 to separator filter 223 applied to filter tray 221 thereby capturing and securing separator filter 223 by and between frame 222 and perforated bottom 230 of filter tray 221. Handle 222A of frame 222 is available to be taken up by hand for carrying filter tray assembly 220 about and for installing filter tray assembly 220 into container 180 of filtering module 53. To remove separator filter 223 and frame 222 from filter tray 221, for replacing separator filter 223 with a fresh separator filter or for cleaning and maintenance, the foregoing operation for installing separator filter 223 and frame 222 to filter tray 221 need only be reversed.

Figure 30:
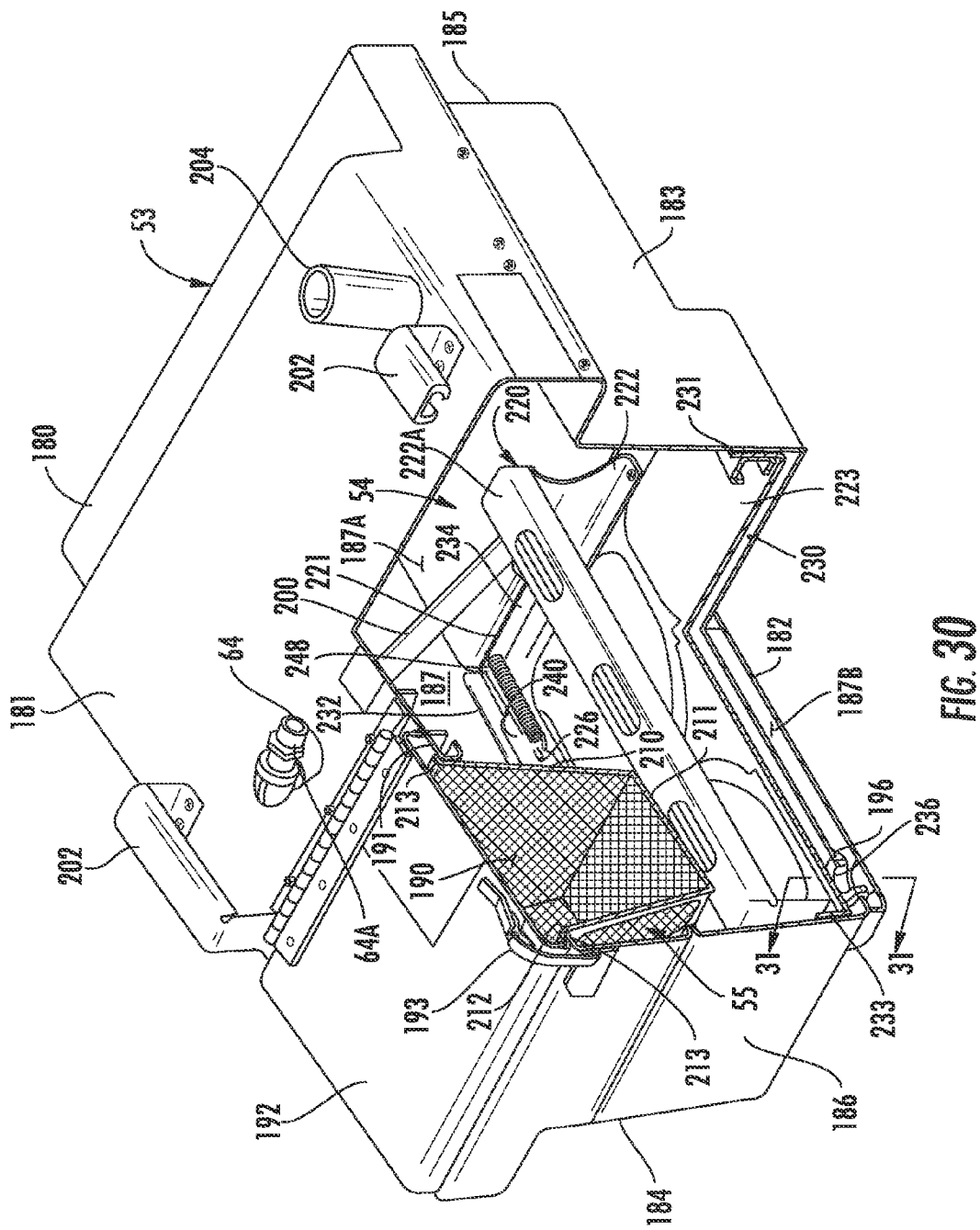
FIG. 30 is a perspective view of the embodiment of FIG. 29 with portions thereof being broken away for illustrative purposes.
Figure 31:
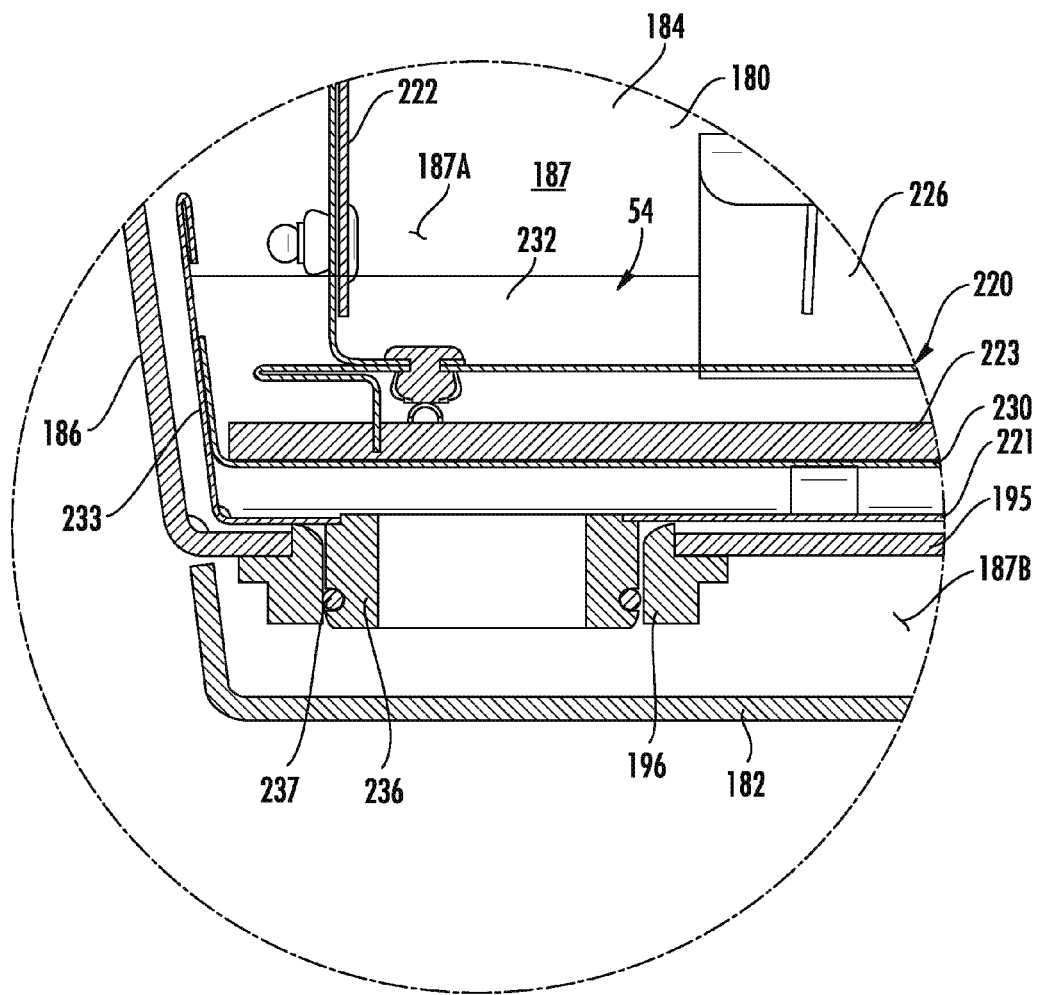
FIG. 31 is an enlarged section view illustrating a coupling between the filter system of FIG. 1 and a drain formed in a sub-floor of the filtering module.

Filter system 54 is installed in container 180, as shown in FIGS. 29-31, in the filtering cooking oil flow pathway through filtering module 53. To install filter system 54 in container 180, hinged lid 192 is unlatched and opened as in FIGS. 27-29 so as to open inlet 190. The assembled filter tray assembly 220 of FIG. 33 is taken up at handle 222A and is applied into upper volume 187A of volume 187 rear end 234 first and perforated bottom 230 down. Perforated bottom 230 is set onto intermediate floor 195 as in FIGS. 29 and 30, and drain 236 is inserted into drain 196 formed in intermediate floor 195, as is best shown in FIG. 31. An O-ring seal 237 is applied into an annular groove 239 formed in the exterior of drain 236 of filter tray 221. O-ring seal 237 is joined between the exterior of drain 236 of filter tray 221 and the interior of drain 196 of intermediate floor 195 so as to inhibit cooking oil blow-by between the exterior of drain 236 formed in perforated bottom 230 of filter tray 221, and the interior of drain 196 of intermediate floor 195, as is best shown in FIG. 31. The application drain 236 of filter tray 221 into drain 196 of intermediate floor 195 couples upper volume 187A of volume 187 in fluid communication with lower volume 187A of volume 187. After so installing filter tray assembly 220, pre-filter 55 is applied bottom 211 into upper volume 187A through inlet 190. Flanges 213 are rested directly against opposed sides of surrounding lip 191 encircling and defining inlet 190 to volume 187 as shown in FIG. 29, and this completes the installation of filter system 54. At this point, hinged lid 192 may be closed and latched, if desired, as is shown in FIG. 30, or kept open, as in FIG. 29, in preparation for cooking oil cleaning operations using system 50. The filtering cooking oil flow pathway through filtering module 53 extends from inlet 190 and through pre-filter 55 in upper volume 187A and through upper volume 187A of volume 187 and through separator filter 223 to drain 196 of intermediate floor 195 and drain 236 of filter tray 221. The filtering cooking oil flow pathway passes through drain 236 of filter tray 221 from upper volume 187A to lower volume 187B of volume 187 and then to conduit 200, and through conduit 200 from lower volume 187B of volume 187 to cleaned cooking oil outlet 64. To remove filter system 54 from container 180, the foregoing operation for installing filter system 54 into container 180 need only be reversed.

As previously intimated, filtering module 53 is configured to be rested on wheeled carriage module 51 as shown in FIGS. 2-6. Specifically, and looking to FIG. 1, filtering module 53 is sized to fit into receiving area 84 of wheeled carriage module 51. Bottom 182, sides 183 and 184, and back 185 are contoured to fit the contours of receiving area 84. To set filtering module 53 into receiving area 84 of wheeled carriage module 51, filtering module 53 is taken up by hand, such as at handles 202 and is held upright from bottom 182 of container 180 to top 181 of container 180, and is set bottom 182 first into receiving area 84 so as to rest bottom 182 against floor 80 juxtaposing side 183 of container 180 along the inside of side sheet 81 of carriage body 77, juxtaposing side 184 of container 180 along the inside of side sheet 82 of carriage body 77, juxtaposing back 185 along the inside of rear end 82 of carriage body 77, and juxtaposing front 183 along the inside of front end 83 of carriage body 77, as is shown in FIG. 2. In this way, filtering module 53 is held by carriage body 77 upright from bottom 182 at floor 80 to top 181, which extends above upper marginal edges 81A at the top of carriage body 77 of wheeled carriage module 51. Back 185 of container 180 of filtering module is partially received in receiving area 110, under inlets 61 and 66, of pump module 52 removably coupled to wheeled carriage module 51. Upstanding lips 80A formed in floor 80 along front end 83 of carriage body 77 of wheeled carriage module 51 interfere with front 186 of container 180 near bottom 182 so as to inhibit filtering module 53 from slipping out from receiving area 84 through front end 83 of wheeled carriage module 51.

With filtering module 53 rested in place upon wheeled carriage module 51, filtering module 53 may then be coupled in fluid communication to pump module 53 as explained above by removably coupling cleaned cooking oil inlet 61 of pump module 52 to cleaned cooking oil outlet 64 of filtering module 53 via hose 65, and this extends and further defines the filtering cooking oil flow path through hose 65 from cleaned cooking oil outlet 64 of filtering module 53 to cleaned cooking oil inlet 61 of manifold 141 of pump module 52 and through manifold 141 in the cleaned cooking oil setting of valve 67 from cleaned cooking oil inlet 61 to cooking oil return outlet 60 for application of cleaned cooking oil to wand 70 removably coupled in fluid communication to cooking oil return outlet 60 via hose 71. With this arrangement, the assembly of wheeled carriage module 51 and pump module 52 and filtering module 53 may be wheeled about over the floor. Conveniently, handle 113 is of pump module 52 may be taken up by hand to wheel the assembly of wheeled carriage module 51 and pump module 52 and filtering module 53 about over a floor.

In the use of system 50 to clean via filtering used cooking oil from a deep fat fryer, system 50 is wheeled over to a deep fat fryer, valve 67 is set to the clean oil setting corresponding to "T" as in FIG. 7 and hinged lid 192 to inlet 190 of filtering module 53 is opened as in FIG. 29 and used cooking oil is drained or pumped from the deep fat fryer through inlet 190 and into pre-filter 55, which strains the used cooking oil so as to remove gross solid contaminants, such as pieces of food left in the used cooking oil from deep fat frying, from the flow of used cooking oil applied through inlet 190 and into upper volume 187A of volume 187 of container 180 through pre-filter 55. Pre-filter 55 thus removes gross solid contaminants from the flow of used cooking oil through the filtering cooking oil flow pathway before the separator filter 223. Pump 140 of pump module 52 is activated via pump switch 161 in either the direct power mode or battery power mode of operation of pump module 52. When activated, pump 140 draws used cooking oil through the filtering cooking oil flow pathway through upper volume 187A from pre-filter 55 to separator filter 223 held by filter tray assembly 220. As pump 140 continues to operate, the used cooking is drawn through separator filter 223 which filters to used cooking oil so as to produce filtered or what is considered cleaned cooking oil, which is drawn through drain 236 of filter tray 221 from upper volume 187A of volume 187 to lower volume 187B of volume 187. Drain 236 is a restricted cooking oil flow pathway or channel between upper and lower volumes 187A and 187B, and this produces a suction effect at drain 236 between upper and lower volumes 187A and 187B as pump operates. As pump 140 again continues to operate, the cleaned cooking oil applied to lower volume 187B is pumped through the filtering cooking oil flow pathway to conduit 200 from lower volume 187B of volume 187 to cleaned cooking oil outlet 64, to cleaned cooking oil inlet 61 of manifold of pump module 52 via hose 65 removably coupled in fluid communication to cleaned cooking oil outlet 64 of filtering module 53 and cleaned cooking oil inlet 61 of manifold 141 of pump module 52, through manifold 141 from cleaned cooking oil inlet 61 to cooking oil return outlet 60, to wand 70 via hose 71 removably coupled in fluid communication to cooking oil return outlet 60 and wand 70, and outwardly through wand 70, which is held and aimed to direct the cleaned cooking oil back into the deep fat fryer from wand 70. This process is continued so as to recirculate the cooking oil between the deep fat fryer and the filtering cooking oil flow pathway of system until the cooking oil is sufficiently cleaned via filtering through filtering module 53. The duration of this cooking oil filtering process with system 50 depends on the capacity of the deep fat fryer. For instance, a 35-50 pound cooking oil capacity deep fat fryer will take approximately four (4) minutes to clean via filtering using system 50, and the cleaning time will vary depending on the cooking oil capacity of the deep fat fryer and the dirtiness of the cooking oil. After this filtering process is complete, pump 140 may be simply deactivated, after which wand 70 and hoses 65 and 71 may be detached and cleaned in preparation for re-use, pre-filter 55 may be taken up by hand and emptied and cleaned in preparation for re-use, filter system may be removed from volume 187 of container 180, disassembled, cleaned, and reassembled with a fresh separator filter in preparation for reuse, and container 180 may be readily taken up and removed from wheeled carriage module 51 and cleaned in preparation for reuse. Because the cooking oil of deep fat fryers becomes depleted over time, it is necessary to periodically replenish the used cooking oil with fresh cooking oil, and this is done with the use of fresh cooking oil module 57. In a preferred embodiment, pump module 52 is configured with a conventional built-in timer 178 (FIGS. 17 and 18) operatively coupled to relay switch board module 143 with conventional electrical wiring/connections for automatically deactivating pump 140 after a predetermined time period of pump 140 operation, such as a time period of about 1-6 minutes, so as to prevent pump 140 from overheating.

§D. The Fresh Cooking Oil Module

Referring now in relevant part to FIGS. 41-44, fresh cooking oil module 57 is self-contained and is a tank 260 fashioned of sheet metal, such as aluminum or steel sheet metal, the various parts of which are bent to shape and fastened together with welding and/or rivets. Container 260 is tall slender and is made up of wall components including opposed sides 261 and 262, a front 263 and an opposed back 264 that extend between a top 265 and an opposed bottom 266, which together cooperate to define an interior volume for holding a volume of fresh cooking oil. The interior volume of tank 260 is sized to hold approximately 15 gallons of cooking oil in the present embodiment, and tank 260 may be sized to hold greater to lesser volumes of fresh cooking oil. An inlet for pouring fresh cooking oil into tank 260 is formed in top 265, which can be opened and closed with the usual hinged lid 192' and latch 193' like that of filtering module 53. Hinged lid 192' and latch 193' are identical to that of hinged lid 192 and latch 193 of filtering module 53, with the only difference being that hinged lid 192' of tank 260 is somewhat smaller than hinged lid 192 of filtering module 53.

Fresh cooking oil module 57 is configured to be rested on pump module 52 as shown in FIGS. 2-7 so as to be readily removable. This is done with a hanger assembly configured to simply suspend fresh cooking oil module 57 from pump module 52. The hanger assembly hangers 270 and 271 formed in tank 260 as shown in FIG. 43 that relate to corresponding brackets 275 and 276 formed in housing 100 of pump module 52 as shown in FIG. 1, and in FIGS. 13 and 14. Hangers 270 and 271 are formed in back 264 of tank 260. Hangers 270 and 271 are rigidly affixed to back 264 of tank 260, such as with welding, screws, rivets, or the like. Hangers 270 and 271 are spaced apart hanger 270 being above hanger 271, and are located between sides 261 and 262 and between top 265 and bottom 266. Hanger 270 is above hanger 271 and is considered an upper hanger, and hanger 271 is below hanger 270 and is considered a lower hanger.

Figure 13:
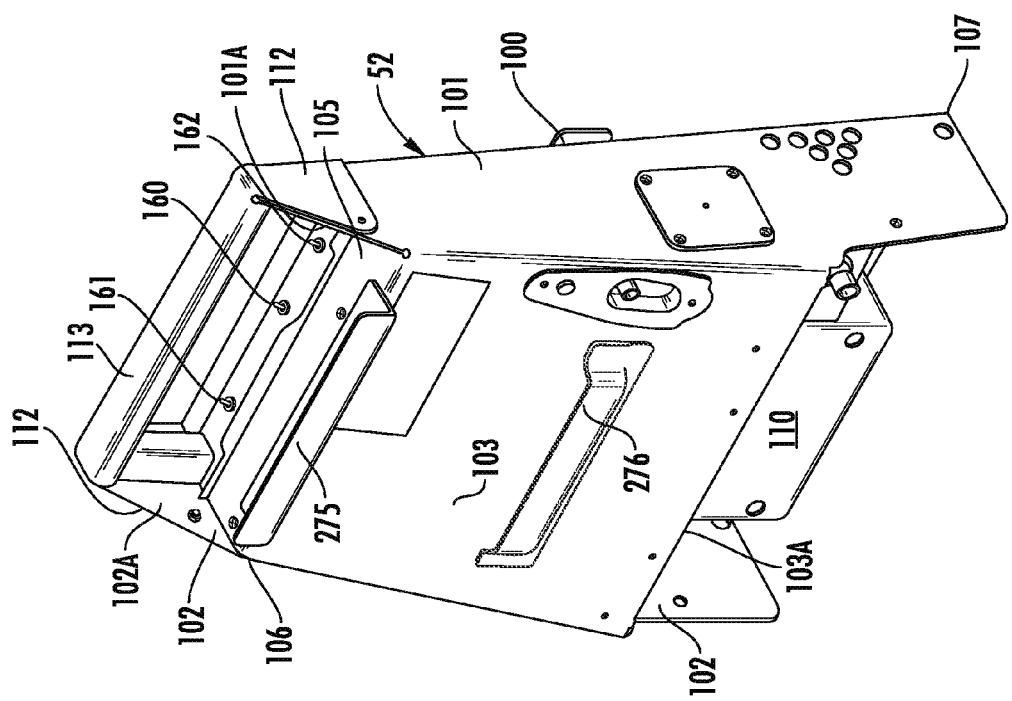
FIG. 13 is a front perspective view of the pump module first illustrated in FIG. 1.

As seen in FIG. 1 and in FIGS. 13 and 14, bracket 275 is formed at the intersection of front 103 and top 105 between side sheets 101 and 102, and bracket 276 is formed in front 103 between top 105 and marginal extremity 103A and between side sheets 101 and 102. Bracket 275 is rigidly affixed to top 105 at the intersection of top 105 and front 103, and bracket 276 is rigidly affixed to front 103, such as with welding, screws, rivets, or the like. Brackets 275 and 276 are spaced apart bracket 275 being above bracket 276, hanger 271. Bracket 275 is above bracket 276 and is considered an upper bracket, and bracket 276 is below bracket 275 and is considered a lower bracket.

Upper and lower brackets 275 and 276 of pump module 52 relate to upper and lower hangers 270 and 271 of tank 260 of fresh cooking oil module 57. To rest fresh cooking oil module 57 on pump module 52 with pump module 52 removably coupled to wheeled carriage module 51 with front 103 facing forwardly in the direction of front end 83 of wheeled carriage module 51, tank 260 is simply taken up by hand, held upright from bottom 266 to top 265, and applied back 264 first toward front 103 of pump module 52 over wheeled carriage module 51 and filtering module 53 rested on wheeled carriage module 51 so as to locate and register upper hanger 270 just over upper bracket 275, and lower hanger 271 just over lower bracket 276. At this point, tank 260 is moved downwardly in the direction toward filtering module 53 and wheeled carriage module 51 hanging upper and lower hangers 270 and 271 on upper and lower brackets 275 and 276, as is shown in FIG. 6, which suspends tank 260 of fresh cooking oil module 57 from pump module 52 along front 103 of tank module 51, over wheeled carriage module 51 and filtering module 53 rested on wheeled carriage module 51, in the direction of front end 83 of wheeled carriage module 51 and front 186 of filtering module 53 rested on wheeled carriage module 51, as shown in FIG. 6. By simply hanging upper and lower hangers 270 and 271 on upper and lower brackets 275 and 276 of pump module 51, tank 260 of fresh cooking oil module 57 is simply rested on pump module 51 so as to be readily separable simply by reversing this hanging operation. Tank 260 of fresh cooking oil module 57 is preferably hung empty of cooking oil to reduce its overall weight, and may be filled with fresh cooking oil after it is rested via hanging on pump module 51. As seen in FIGS. 5 and 6, when tank 260 of fresh cooking oil module 57 is rested on pump module 51 via hanging/suspending, it is located substantially at the center of gravity of system 50 between side sheets 81 of wheeled carriage module 51 and between rear and front ends 82 and 83 of wheeled carriage module 51.

With fresh cooking oil module 57 rested in place on pump module 52, fresh cooking oil module 57 may then be coupled in fluid communication to pump module 53 as explained above by removably coupling fresh cooking oil inlet 66 of pump module 52 to fresh cooking oil outlet 69 of fresh cooking oil module 57 via hose 68, and this extends and further defines the fresh cooking oil flow path through hose 68 from fresh cooking oil outlet 66 of fresh cooking oil module 57 to fresh cooking oil inlet 66 of manifold 141 of pump module 52 and through manifold 141 in the fresh cooking oil setting of valve 67 from fresh cooking oil inlet 66 to cooking oil return outlet 60 for application of fresh cooking oil to wand 70 removably coupled in fluid communication to cooking oil return outlet 60 via hose 71. In this embodiment, pipe or conduit 69B coupling fresh cooking oil outlet 69 consisting of pipe fitting 69A is formed in back 264 of tank 260 near top 265 and side 262. And so with this arrangement, the assembly of wheeled carriage module 51 and pump module 52 and filtering module 53 and fresh cooking oil module 57 may be wheeled about over the floor. Again, handle 113 is of pump module 52 may be taken up by hand to wheel the assembly of wheeled carriage module 51 and pump module 52 and filtering module 53 fresh cooking oil module 57 about over a floor.

In the use of system 50 to furnish fresh cooking oil to a deep fat fryer for replenishment or replacement purposes, system 50 is wheeled over to a deep fat fryer, valve 67 is set to the fresh oil setting corresponding to "F" denoted in FIG. 18. Pump 140 of pump module 52 is activated via pump switch 161 in either the direct power mode or battery power mode of operation of pump module 52. When activated, pump 140 draws fresh cooking oil through the fresh cooking oil flow pathway from tank 260 to fresh cooking oil outlet 69 via pipe or conduit 69B and to fresh cooking oil inlet 66 via hose 68 removably coupled in fluid communication to fresh cooking oil outlet 69 of tank 260 of fresh cooking oil module 57 and fresh cooking oil inlet 66 of manifold 141 of pump module 52, through manifold 141 from fresh cooking oil inlet 66 to cooking oil return outlet 60, to wand 70 via hose 71 removably coupled in fluid communication to cooking oil return outlet 60 and wand 70, and outwardly through wand 70, which is held and aimed to direct the fresh cooking oil into the deep fat fryer from wand 70. This process is continued until the desired amount of fresh cooking oil has been applied to the deep fat fryer or until the supply of fresh cooking oil in tank 260 of fresh cooking oil module 57 is depleted, after which pump 140 may be simply deactivated. Wand 70 and hoses 68 and 71 may be detached and cleaned in preparation for re-use, if so desired. Again, timer 178 (FIGS. 17 and 18) is provided to automatically deactivate pump 140 after a predetermined time period of pump 140 operation, such as a time period of about 1-6 minutes, so as to prevent pump 140 from overheating.

The invention has been described above with reference to preferred embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A portable and modular cooking oil cleaning system, comprising:
   a wheeled carriage module;
   a filtering module, the filtering module is self-contained, is rested exteriorly on the wheeled carriage so as to be readily removable from the wheeled carriage, and includes a used cooking oil inlet, a cleaned cooking oil outlet, and a filter system therebetween;
   a pump module, the pump module is self-contained, is removably coupled exteriorly to the wheeled carriage module so as to be readily removable from the wheeled carriage, and includes a cooking oil return outlet coupled in fluid communication to a cleaned cooking oil inlet configured to be removably coupled in fluid communication to the cleaned cooking oil outlet of the filtering module so as to form a cooking oil flow pathway through the filtering and pump modules from the used cooking oil inlet of the filtering module to the cooking oil return outlet of the pump module, and a pump for generating a flow of used cooking oil through the cooking oil flow pathway;
   the filter system of the cooking oil filtering module for entrapping contaminants from the flow of used cooking oil in the cooking oil flow pathway through the cooking oil filtering module;
   the filtering module and the pump module are removable from the wheeled carriage module independently from one another;
   the filter system comprises a separator filter in the cooking oil flow pathway through the filtering module between the used cooking oil inlet and the cleaned cooking oil outlet; and
   the separator filter is held in the cooking oil flow pathway by a filter tray mounted to the filtering module.

2. The portable and modular cooking oil cleaning system according to claim 1, wherein the pump module is removably coupled to the wheeled carriage module with mechanical fastening.

3. The portable and modular cooking oil cleaning system according to claim 1, wherein the filter system further comprises:
   a pre-filter in the cooking oil flow pathway through the filtering module between the used cooking oil inlet and the separator filter for removing gross solid contaminants from the flow of used cooking oil before the separator filter.

4. The portable and modular cooking oil cleaning system according to claim 1, further comprising a frame coupled to the filter tray so as to hold the separator filter to the filter tray.

5. The portable and modular cooking oil cleaning system according to claim 4, further comprising a brace assembly configured to hold the frame to the separator filter so as to hold the separator filter to the filter tray.

6. The portable and modular cooking oil cleaning system according to claim 5, wherein the brace assembly comprises spring-loaded braces configured to extend toward the frame so as to urge the frame to the separator filter.

7. The portable and modular cooking oil cleaning system according to claim 1, wherein the pump module further comprises:
   the cooking oil return outlet comprises a pipe fitting configured to be removably coupled in fluid communication to an outtake hose fitting of an outtake hose; and
   a fitting kill switch operatively coupled between the pipe fitting of the cooking oil return outlet and the pump for enabling the pump in response to a competent coupling between the outtake hose fitting of the outtake hose and the pipe fitting of the cooking oil return outlet, and for disabling the pump in response to an incompetent coupling between the outtake hose fitting of the outtake hose and the pipe fitting of the cooking oil return outlet.

8. The portable and modular cooking oil cleaning system according to claim 1, wherein the pump module further comprises:
   a compartment closeable with a detachable cover;
   a cover kill switch operatively coupled between the detachable cover and the pump for enabling the pump in response to a competent closure of the compartment with the detachable cover, and for disabling the pump in response to an incompetent closure of the compartment with the detachable cover.

9. The portable and module cooking oil cleaning system according to claim 8, wherein the compartment houses a battery power source operatively coupled to power the pump.

10. A portable and modular cooking oil cleaning and cooking oil replenishment system, comprising:
   a wheeled carriage module;
   a filtering module, the filtering module is self-contained, is rested exteriorly on the wheeled carriage so as to be readily removable from the wheeled carriage, and includes a used cooking oil inlet, a cleaned cooking oil outlet, and a filter system therebetween;
   a pump module, the pump module is self-contained, is removably coupled exteriorly to the wheeled carriage module so as to be readily removable from the wheeled carriage, and includes a cooking oil return outlet coupled in fluid communication to a fresh cooking oil inlet and to a cleaned cooking oil inlet, a filtering cooking oil flow pathway is formed through the filtering and pump modules from the used cooking oil inlet of the filtering module to the cooking oil return outlet of the pump module when the cleaned cooking oil inlet is removably coupled in fluid communication to the cleaned cooking oil outlet of the filtering module, a pump for generating a flow of used cooking oil through the filtering cooking oil flow pathway, a valve coupled between the cleaned cooking oil and fresh cooking oil inlets, a pump switch, electrically connected to the pump, for activating and deactivating the pump, and a power switch, electrically connected to the pump, movable between an ON position and an OFF position, wherein the pump switch is disabled from activating and deactivating the pump when the power switch is in the OFF position, and the pump switch is enabled for activating and deactivating the pump when the power switch is in the ON position;
   the filter system of the cooking oil filtering module for entrapping contaminants from the flow of used cooking oil in the cooking oil flow pathway through the cooking oil filtering module;

a fresh cooking oil module, the fresh cooking oil module is self-contained and is rested exteriorly on the wheeled carriage so as to be readily removable from the wheeled carriage;

a fresh cooking oil flow pathway is formed from the fresh cooking oil module to the cooking oil return outlet of the pump module when the fresh cooking oil inlet of the pump module is removably coupled in fluid communication to the fresh cooking oil module, and the pump for generating a flow of fresh cooking oil through the fresh cooking oil flow pathway;

the valve of the pump module being adjustable between a cleaned cooking oil setting isolating the cooking oil return outlet from the fresh cooking oil inlet, and a fresh cooking oil setting isolating the cooking oil return outlet from the cleaned cooking oil inlet;

the valve enables the filtering cooking oil flow pathway and disables the fresh cooking oil flow pathway, when the valve is in the cleaned cooking oil setting;

the valve disables the filtering cooking oil flow pathway and enables the fresh cooking oil flow pathway, when the valve is in the fresh cooking oil setting; and the filtering module, the pump module, and the fresh cooking oil module are removable from the wheeled carriage module independently from one another.

11. The portable and modular cooking oil cleaning system and cooking oil replenishment according to claim 10, wherein the pump module is removably coupled to the wheeled carriage module with mechanical fastening.

12. The portable and modular cooking oil cleaning and cooking oil replenishment system according to claim 10, wherein the filter system comprises:

a separator filter in the cooking oil flow pathway through the filtering module between the used cooking oil inlet and the cleaned cooking oil outlet; and a pre-filter in the cooking oil flow pathway through the filtering module between the used cooking oil inlet and the separator filter for removing gross solid contaminants from the flow of used cooking oil before the separator filter.

13. The portable and modular cooking oil cleaning and cooking oil replenishment system according to claim 12, wherein the separator filter is held in the cooking oil flow pathway by a filter tray mounted to the filtering module.

14. The portable and modular cooking oil cleaning and cooking oil replenishment system according to claim 13, further comprising a frame coupled to the filter tray so as to hold the separator filter to the filter tray.

15. The portable and modular cooking oil cleaning and cooking oil replenishment system according to claim 14, further comprising a brace assembly configured to hold the frame to the separator filter so as to hold the separator filter to the filter tray.

16. The portable and modular cooking oil cleaning and cooking oil replenishment system according to claim 15, wherein the brace assembly comprises spring-loaded braces configured to extend toward the frame so as to urge the frame to the separator filter.

17. The portable and modular cooking oil cleaning and cooking oil replenishment system according to claim 10, wherein the pump module further comprises:

the cooking oil return outlet comprises a pipe fitting configured to be removably coupled in fluid communication to an outtake hose fitting of an outtake hose; and a fitting kill switch operatively coupled between the pipe fitting of the cooking oil return outlet and the pump for enabling the pump in response to a competent coupling between the outtake hose fitting of the outtake hose and the pipe fitting of the cooking oil return outlet, and for disabling the pump in response to an incompetent coupling between the outtake hose fitting of the outtake hose and the pipe fitting of the cooking oil return outlet.

18. The portable and modular cooking oil cleaning and cooking oil replenishment system according to claim 10, wherein the pump module further comprises:

a compartment closeable with a detachable cover;

a cover kill switch operatively coupled between the detachable cover and the pump for enabling the pump in response to a competent closure of the compartment with the detachable cover, and for disabling the pump in response to an incompetent closure of the compartment with the detachable cover.

19. The portable and modular cooking oil cleaning and cooking oil replenishment system according to claim 18, wherein the compartment houses a battery power source operatively coupled to power the pump.

20. A portable and modular cooking oil cleaning system, comprising:

a wheeled carriage module;

a filtering module, the filtering module is self-contained, is rested exteriorly on the wheeled carriage so as to be readily removable from the wheeled carriage, and includes a used cooking oil inlet, a cleaned cooking oil outlet, and a filter system therebetween;

a pump module, the pump module is self-contained, is removably coupled exteriorly to the wheeled carriage module so as to be readily removable from the wheeled carriage, and includes a cooking oil return outlet coupled in fluid communication to a cleaned cooking oil inlet configured to be removably coupled in fluid communication to the cleaned cooking oil outlet of the filtering module so as to form a cooking oil flow pathway through the filtering and pump modules from the used cooking oil inlet of the filtering module to the cooking oil return outlet of the pump module, and a pump for generating a flow of used cooking oil through the cooking oil flow pathway;

the filter system of the cooking oil filtering module for entrapping contaminants from the flow of used cooking oil in the cooking oil flow pathway through the cooking oil filtering module;

the filtering module and the pump module are removable from the wheeled carriage module independently from one another; and the pump module further includes a compartment closeable with a detachable cover, and a cover kill switch operatively coupled between the detachable cover and the pump for enabling the pump in response to a competent closure of the compartment with the detachable cover, and for disabling the pump in response to an incompetent closure of the compartment with the detachable cover.

21. The portable and module cooking oil cleaning system according to claim 8, wherein the compartment houses a battery power source operatively coupled to power the pump.

* * * * *